United States Patent
Sadek

(10) Patent No.: US 10,542,435 B2
(45) Date of Patent: *Jan. 21, 2020

(54) CARRIER SENSE ADAPTIVE TRANSMISSION (CSAT) IN UNLICENSED SPECTRUM

(71) Applicant: QUALCOMM Incorporated, San Diego, CA (US)

(72) Inventor: Ahmed Kamel Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 14/486,717

(22) Filed: Sep. 15, 2014

(65) Prior Publication Data

US 2015/0085684 A1    Mar. 26, 2015

Related U.S. Application Data

(60) Provisional application No. 61/881,837, filed on Sep. 24, 2013, provisional application No. 61/920,272, filed on Dec. 23, 2013.

(51) Int. Cl.
*G06F 11/00* (2006.01)
*H04W 16/14* (2009.01)
(Continued)

(52) U.S. Cl.
CPC .............. *H04W 16/14* (2013.01); *H04J 3/16* (2013.01); *H04W 72/082* (2013.01);
(Continued)

(58) Field of Classification Search
CPC ....... H04W 48/16; H04L 5/0073; H04L 47/10
See application file for complete search history.

(56) References Cited

U.S. PATENT DOCUMENTS 8,509,802 B2    8/2013  Li et al.
9,173,121 B2    10/2015 Ji et al.
(Continued)

FOREIGN PATENT DOCUMENTS

CN          1653838 A      8/2005
CN          101047995 A    10/2007
(Continued)

OTHER PUBLICATIONS

Ericsson: "DRX with Carrier Aggregation in LTE-Advanced" 3GPP Draft; R2-092959 DRX in Carrier Aggregation LTE-Advanced, SRD Generation Partnership Project (3GPP), Mobile Competence Centre; 650, Route Des Lucioles; F-06921 Sophia-Antipolis Cedex; France, No. San Francisco, USA; 20090428, Apr. 28, 2009 (Apr. 28, 2009), pp. 1-3, XP050340753.
(Continued)

*Primary Examiner* — Samina F Choudhry
(74) *Attorney, Agent, or Firm* — Muncy, Geissler, Olds & Lowe, P.C.

(57) ABSTRACT

Systems and methods for Carrier Sense Adaptive Transmission (CSAT) and related operations in unlicensed spectrum are disclosed to reduce interference between co-existing Radio Access Technologies (RATs). The parameters for a given CSAT communication scheme may be adapted dynamically based on received signals from a transceiver for a native RAT to be protected and an identification of how that RAT is utilizing a shared resource such as an unlicensed band. Other operations such as Discontinuous Reception (DRX) may be aligned with a CSAT Time Division Multiplexed (TDM) communication pattern by way of a DRX broadcast/multicast message. Different TDM communication patterns may be staggered in time across different frequencies. Channel selection for a co-existing RAT may also be configured to afford further protection to native RATs
(Continued)

by preferring operation on secondary channels as opposed to primary channels.

20 Claims, 22 Drawing Sheets

(51) Int. Cl.
| | |
|---|---|
| H04J 3/16 | (2006.01) |
| H04W 72/12 | (2009.01) |
| H04W 72/08 | (2009.01) |
| H04W 74/08 | (2009.01) |
| H04W 76/28 | (2018.01) |
| H04L 5/00 | (2006.01) |
| H04J 3/00 | (2006.01) |

(52) U.S. Cl.
CPC ... *H04W 72/1215* (2013.01); *H04W 74/0808* (2013.01); *H04J 3/00* (2013.01); *H04L 5/0053* (2013.01); *H04L 5/0098* (2013.01); *H04W 76/28* (2018.02)

(56) References Cited

U.S. PATENT DOCUMENTS

| | | |
|---|---|---|
| 9,750,014 B2 | 8/2017 | Sadek et al. |
| 2002/0061031 A1 | 5/2002 | Sugar et al. |
| 2003/0181211 A1 | 9/2003 | Razavilar et al. |
| 2008/0056201 A1 | 3/2008 | Bennett |
| 2009/0129332 A1 | 5/2009 | Dayal et al. |
| 2009/0285169 A1 | 11/2009 | Yang et al. |
| 2010/0172254 A1* | 7/2010 | Sachs ............... H04W 48/18 370/252 |
| 2011/0128895 A1 | 6/2011 | Sadek et al. |
| 2011/0294508 A1 | 12/2011 | Min et al. |
| 2012/0069766 A1 | 3/2012 | Fu et al. |
| 2012/0082140 A1* | 4/2012 | Lin ............... H04W 72/1215 370/336 |
| 2012/0093009 A1 | 4/2012 | Wang et al. |
| 2012/0094681 A1 | 4/2012 | Freda et al. |
| 2012/0170557 A1 | 7/2012 | Tsfati et al. |
| 2012/0188907 A1* | 7/2012 | Dayal ............ H04W 72/1215 370/254 |
| 2012/0243498 A1 | 9/2012 | Kwon et al. |
| 2012/0250631 A1 | 10/2012 | Hakola et al. |
| 2012/0264468 A1 | 10/2012 | Turtinen et al. |
| 2012/0307744 A1 | 12/2012 | Charbit et al. |
| 2013/0003591 A1 | 1/2013 | Novak et al. |
| 2013/0010766 A1 | 1/2013 | Sadek et al. |
| 2013/0034018 A1 | 2/2013 | Wei |
| 2013/0058245 A1 | 3/2013 | Van Lieshout et al. |
| 2013/0083661 A1 | 4/2013 | Gupta et al. |
| 2013/0094467 A1 | 4/2013 | Kwon et al. |
| 2013/0142059 A1* | 6/2013 | Di Girolamo ......... H04L 12/66 370/252 |
| 2013/0178225 A1 | 7/2013 | Xing |
| 2013/0194981 A1 | 8/2013 | Wang et al. |
| 2013/0208587 A1* | 8/2013 | Bala ............... H04W 16/14 370/230 |
| 2013/0235814 A1 | 9/2013 | Wietfeldt et al. |
| 2013/0242924 A1 | 9/2013 | Kim et al. |
| 2013/0272260 A1 | 10/2013 | Bitran et al. |
| 2014/0036818 A1 | 2/2014 | Koskela al. |
| 2014/0044000 A1 | 2/2014 | Charbit et al. |
| 2014/0044105 A1 | 2/2014 | Bontu et al. |
| 2014/0045494 A1 | 2/2014 | Pekonen et al. |
| 2014/0050146 A1 | 2/2014 | Chrisikos et al. |
| 2014/0050170 A1 | 2/2014 | Xu et al. |
| 2014/0087748 A1 | 3/2014 | Hong et al. |
| 2014/0112155 A1* | 4/2014 | Lindoff ............... H04W 24/08 370/242 |
| 2014/0126403 A1 | 5/2014 | Siomina |
| 2014/0301351 A1 | 10/2014 | Gao et al. |
| 2015/0055621 A1 | 2/2015 | Koskinen |
| 2015/0063245 A1 | 3/2015 | Gao et al. |
| 2015/0085683 A1 | 3/2015 | Sadek et al. |
| 2015/0085792 A1 | 3/2015 | Reddy et al. |
| 2015/0085841 A1 | 3/2015 | Sadek |
| 2015/0163794 A1 | 6/2015 | Liang et al. |
| 2015/0163801 A1 | 6/2015 | Sadek |
| 2015/0163823 A1 | 6/2015 | Sadek et al. |
| 2015/0208413 A1 | 7/2015 | Takano |
| 2015/0236782 A1 | 8/2015 | Kadous et al. |
| 2015/0296560 A1 | 10/2015 | Sadek et al. |
| 2016/0338107 A1 | 11/2016 | Zeng et al. |

FOREIGN PATENT DOCUMENTS

| | | |
|---|---|---|
| CN | 101808333 A | 8/2010 |
| CN | 101600212 B | 6/2011 |
| JP | 2009267995 A | 11/2009 |
| JP | 2010166354 A | 7/2010 |
| JP | 2011066895 A | 3/2011 |
| JP | 2012034326 A | 2/2012 |
| JP | 2012085329 A | 4/2012 |
| JP | 2013110673 A | 6/2013 |
| JP | 2014502083 A | 1/2014 |
| JP | 2014523654 A | 9/2014 |
| JP | 2015508958 A | 3/2015 |
| JP | 2015515160 A | 5/2015 |
| WO | 2010147956 A2 | 12/2010 |
| WO | 2011134491 A1 | 11/2011 |
| WO | 2011150163 A1 | 12/2011 |
| WO | 2012051303 A1 | 4/2012 |
| WO | 2012061030 A1 | 5/2012 |
| WO | 2012061484 A2 | 5/2012 |
| WO | 2012092574 A1 | 7/2012 |
| WO | 2012093349 A2 | 7/2012 |
| WO | 2012101481 A1 | 8/2012 |
| WO | 2013006988 A1 | 1/2013 |
| WO | 2013009347 A1 | 1/2013 |
| WO | 2013019177 A1 | 2/2013 |
| WO | 2013063808 A1 | 5/2013 |
| WO | 2013071488 A1 | 5/2013 |
| WO | 2013086659 A1 | 6/2013 |
| WO | 2013096563 A1 | 6/2013 |
| WO | 2013096928 A1 | 6/2013 |
| WO | 2013100827 A1 | 7/2013 |
| WO | 2013106745 A1 | 7/2013 |
| WO | 2013112983 A2 | 8/2013 |
| WO | 2013116662 A1 | 8/2013 |
| WO | 2013131257 A1 | 9/2013 |
| WO | 2013133928 A1 | 9/2013 |

OTHER PUBLICATIONS

Huawei: "Carrier aggregation in active mode", 3GPP Draft; R2-093104 Carrier Aggregation in Active Mode, 3rd Generation Partnership Project (3GPP), Mobile Competence Centre; 650, Route Des Lucioles; F-06921 Sophia-Antipolis Cedex; France, No. San Francisco, USA; 20090428, Apr. 28, 2009 (Apr. 28, 2009), 4 pages, XP050340846, [retrieved on Apr. 28, 2009] p. 2, paragraph 2.3-p. 3.

International Search Report and Written Opinion—PCT/US2014/055730—ISA/EPO—Jul. 15, 2015.

Intel Corporation: "Discussion on in-device coexistence scenarios and solutions", 3GPP Draft; R2-104382, 3rd Generation Partnership Project (3GPP), Mobile Competence Centre ; 650, Route Des Lucioles ; F-06921 Sophia-Antipolis Cedex; France, vol. RAN WG2, No. Madrid, Spain; 20100823, Aug. 16, 2010 (Aug. 16, 2010), XP050451684, [retrieved on Aug. 16, 2010] paragraph [02.1]—paragraph [02.2] paragraph [03.2]—paragraph [03.3].

Partial International Search Report—PCT/US2014/055730—ISA/EPO—Apr. 14, 2015.

Ratasuk R. et al., "License-exempt LTE deployment in heterogeneous network", Wireless Communication Systems (ISWCS), 2012 International Symposium on, IEEE, Aug. 28, 2012 (Aug. 28, 2012), pp. 246-250 , XP032263759, DOI: 10.1109/ISWCS.2012.6328367, ISBN: 978-1-4673-0761-1.

Zte: "Further analysis on in-device coexistence interference avoidance solutions", 3GPP Draft; R2-105361 Further Analysis on In-

(56) References Cited

OTHER PUBLICATIONS

Device Coexistence Interference, 3rd Generation Partnership Project (3GPP), Mobile Competence Centre; 650, Route Des Lucioles; F-06921 Sophia-Antipolis Cedex; France, vol. RAN WG2, No. Xi'an; Oct. 11, 2010, Oct. 3, 2010 (Oct. 3, 2010), pp. 1-8, XP050452409, [retrieved on Oct. 3, 2010].
Wikipedia entry for "Estimation", Aug. 15, 2013, pp. 1-8, Retrieved from the Internet URL: web.archive.org/web/20130815221500/ http://en.wikipedia.org/wiki/Estimation_theory, whole document.
Garcia L.G., et al., "Autonomous Component Carrier Selection for Local Area Uncoordinated Deployment of LTE Advanced", 2013 IEEE 78th Vehicular Technology Conference (VTC Fall), XP055260442, Sep. 1, 2009, pp. 1-5, ISSN: 1090-3038, DOI: 10.1109/VETECF.2009.5378826.
Casaccia L., "Considerations for LTE Enhancements and Evolution", 3GPP, RWS-120007, 3GPP, May 31st, 2015, pp.1-15, Url: http://www.3gpp.org/ftp/workshop/2012-06-11_12_RAN_REL12/Docs/RWS-120007.zip.
"Introducing LTE in Unlicensed Spectrum", 3GPP Draft; RP-131635 LTE in Unlicensed Spectrum, 3RD Generation Partnership Project (3GPP), Mobile Competence Centre; 650, Route Des Lucioles; F-06921 Sophia-Antipolis Cedex; France no. Busan, South Korea; 20131203-20131207 Dec. 2, 2013, Retrieved from the Internet: Url:http://www.3gpp.orgiftp/ Vleetings_3GPP Sync/Ran/Ran/Docs/ [dated Dec. 2, 2013] the whole document.

\* cited by examiner

CARRIER SENSE ADAPTIVE TRANSMISSION (CSAT) IN UNLICENSED SPECTRUM

CROSS-REFERENCE TO RELATED APPLICATIONS

The present application for patent claims the benefit of U.S. Provisional Application No. 61/881,837, entitled "ADAPTING COMMUNICATION BASED ON RESOURCE UTILIZATION," filed Sep. 24, 2013, and U.S. Provisional Application No. 61/920,272, entitled "ADAPTING COMMUNICATION BASED ON RESOURCE UTILIZATION," filed Dec. 23, 2013, both assigned to the assignee hereof, and expressly incorporated herein by reference in their entirety.

REFERENCE TO CO-PENDING APPLICATIONS FOR PATENT

The present Application for Patent is also related to the following co-pending U.S. patent application Ser. No. 14/486,855: "CARRIER SENSE ADAPTIVE TRANSMISSION (CSAT) IN UNLICENSED SPECTRUM,", having filed concurrently herewith, assigned to the assignee hereof, and expressly incorporated herein by reference in its entirety.

INTRODUCTION

Aspects of this disclosure relate generally to telecommunications, and more particularly to co-existence between wireless Radio Access Technologies (RATs) and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Third Generation Partnership Project (3GPP), 3GPP Long Term Evolution (LTE), Ultra Mobile Broadband (UMB), Evolution Data Optimized (EV-DO), Institute of Electrical and Electronics Engineers (IEEE), etc.

In cellular networks, "macro cell" base stations provide connectivity and coverage to a large number of users over a certain geographical area. A macro network deployment is carefully planned, designed, and implemented to offer good coverage over the geographical region. Even such careful planning, however, cannot fully accommodate channel characteristics such as fading, multipath, shadowing, etc., especially in indoor environments. Indoor users therefore often face coverage issues (e.g., call outages and quality degradation) resulting in poor user experience.

To improve indoor or other specific geographic coverage, such as for residential homes and office buildings, additional "small cell," typically low-power base stations have recently begun to be deployed to supplement conventional macro networks. Small cell base stations may also provide incremental capacity growth, richer user experience, and so on.

Recently, small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other RATs that typically utilize the same unlicensed bands, most notably IEEE 802.11x WLAN technologies generally referred to as "Wi-Fi."

There therefore remains a need for improved co-existence for various devices operating in the increasingly crowded unlicensed frequency spectrum.

SUMMARY

Systems and methods for Carrier Sense Adaptive Transmission (CSAT) and related operations in unlicensed spectrum are disclosed.

A method of CSAT for reducing interference between Radio Access Technologies (RATs) is disclosed. The method may comprise, for example: receiving signals via a resource, wherein a first transceiver operating in accordance with a first RAT is used to receive the signals; identifying a utilization of the resource that is associated with the first RAT, wherein the identification is based on the received signals; setting one or more cycling parameters of a Time Division Multiplexing (TDM) communication pattern defining activated and deactivated periods of transmission for a second RAT sharing the resource, wherein the setting is based on the identified utilization of the resource; and cycling operation of the second RAT between activated and deactivated periods of transmission over the resource in accordance with the TDM communication pattern.

An apparatus for CSAT for reducing interference between RATs is also disclosed. The apparatus may comprise, for example, a transceiver, a processor, and memory coupled to the processor for storing related data and instructions. The transceiver may be configured to, for example, receive signals via a resource, wherein the transceiver operates in accordance with a first RAT to receive the signals. The processor may be configured to, for example: identify a utilization of the resource that is associated with the first RAT, wherein the identification is based on the received signals; set one or more cycling parameters of a TDM communication pattern defining activated and deactivated periods of transmission for a second RAT sharing the resource, wherein the setting is based on the identified utilization of the resource; and control cycling of operation of the second RAT between activated and deactivated periods of transmission over the resource in accordance with the TDM communication pattern.

Another method of coordinating Discontinuous Reception (DRX) configurations across user devices in a wireless communication system is also disclosed. The method may comprise, for example: assigning different DRX configurations for different communication channels; transmitting a DRX configuration message to a plurality of user devices specifying one or more DRX parameters for each of the different DRX configurations; and communicating via the communication channels, wherein for each of the communication channels, the communication uses a corresponding one of the DRX configurations.

Another apparatus for coordinating DRX configurations across user devices in a wireless communication system is also disclosed. The apparatus may comprise, for example, a transceiver, a processor, and memory coupled to the processor for storing related data and instructions. The processor may be configured to, for example, assign different DRX configurations for different communication channels. The transceiver may be configured to, for example: transmit a DRX configuration message to a plurality of user devices specifying one or more DRX parameters for each of the different DRX configurations; and communicate via the communication channels, wherein for each of the communication channels, the communication uses a corresponding one of the DRX configurations.

Another method of CSAT for reducing interference between RATs is also disclosed. The method may comprise, for example: receiving signals via a resource, wherein a first RAT is used to receive the signals; identifying a utilization of the resource that is associated with the first RAT, wherein the identification is based on the received signals; setting one or more cycling parameters of a first TDM communication pattern defining activated and deactivated periods of transmission on a first frequency for a second RAT sharing the resource, wherein the setting is based on the identified utilization of the resource; setting one or more cycling parameters of a second TDM communication pattern defining activated and deactivated periods of transmission on a second frequency for the second RAT, wherein the setting is based on the identified utilization of the resource, and wherein the first TDM communication pattern and the second TDM communication pattern are staggered in time with respect to an overlap in their activated and deactivated periods; and cycling operation of the second RAT between activated and deactivated periods of transmission over the resource on the first and second frequencies in accordance with the first and second TDM communication patterns.

Another apparatus for CSAT for reducing interference between RATs is also disclosed. The apparatus may comprise, for example, a transceiver, a processor, and memory coupled to the processor for storing related data and instructions. The transceiver may be configured to, for example, receive signals via a resource, wherein the first transceiver operates in accordance with a first RAT to receive the signals. The processor may be configured to, for example: identify a utilization of the resource that is associated with the first RAT, wherein the identification is based on the received signals; set one or more cycling parameters of a first TDM communication pattern defining activated and deactivated periods of transmission on a first frequency for a second RAT sharing the resource, wherein the setting is based on the identified utilization of the resource; set one or more cycling parameters of a second TDM communication pattern defining activated and deactivated periods of transmission on a second frequency for the second RAT, wherein the setting is based on the identified utilization of the resource, and wherein the first TDM communication pattern and the second TDM communication pattern are staggered in time with respect to an overlap in their activated and deactivated periods; and control cycling of operation of the second RAT between activated and deactivated periods of transmission over the resource on the first and second frequencies in accordance with the first and second TDM communication patterns.

Another method of channel selection among a plurality of frequencies for reducing interference between RATs is also disclosed. The method may comprise, for example: receiving signals via a resource, wherein a first RAT is used to receive the signals; identifying a utilization of the resource that is associated with the first RAT, wherein the identification is based on the received signals; selecting a first frequency from the plurality of frequencies for communication over the resource by a second RAT in response to the identified utilization of the resource being below a clean channel threshold on the first frequency; and selecting a second frequency from the plurality of frequencies for communication over the resource by the second RAT in response to the identified utilization of the resource being above the clean channel threshold on each of the plurality of frequencies, wherein a frequency associated with a secondary channel of the first RAT is selected as the second frequency if one or more secondary channels are identified as operating on the resource, and wherein a frequency associated with a primary channel of the first RAT is selected as the second frequency if no secondary channels are identified as operating on the resource.

Another apparatus for channel selection among a plurality of frequencies for reducing interference between RATs is also disclosed. The apparatus may comprise, for example, a transceiver, a processor, and memory coupled to the processor for storing related data and instructions. The transceiver may be configured to, for example, receive signals via a resource, wherein the first transceiver operates in accordance with a first RAT to receive the signals. The processor may be configured to, for example: identify a utilization of the resource that is associated with the first RAT, wherein the identification is based on the received signals; select a first frequency from the plurality of frequencies for communication over the resource by a second RAT in response to the identified utilization of the resource being below a clean channel threshold on the first frequency; and select a second frequency from the plurality of frequencies for communication over the resource by the second RAT in response to the identified utilization of the resource being above the clean channel threshold on each of the plurality of frequencies, wherein a frequency associated with a secondary channel of the first RAT is selected as the second frequency if one or more secondary channels are identified as operating on the resource, and wherein a frequency associated with a primary channel of the first RAT is selected as the second frequency if no secondary channels are identified as operating on the resource.

BRIEF DESCRIPTION OF THE DRAWINGS

The accompanying drawings are presented to aid in the description of various aspects of the disclosure and are provided solely for illustration of the aspects and not limitation thereof

DETAILED DESCRIPTION

Figure 1:
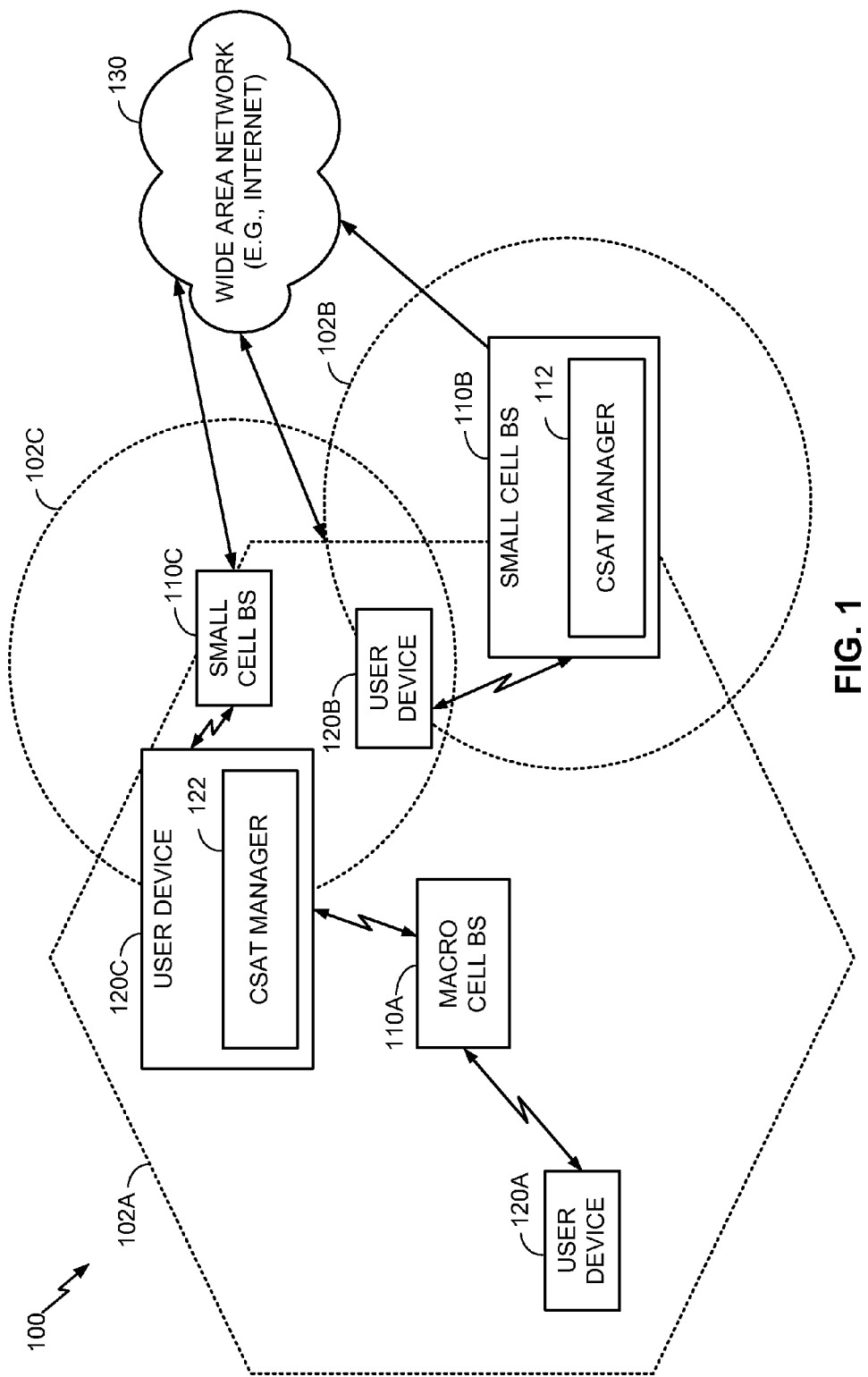
FIG. 1 illustrates an example mixed-deployment wireless communication system including macro cell base stations and small cell base stations.

The present disclosure relates generally to Carrier Sense Adaptive Transmission (CSAT) communication and various related aspects to reduce interference between co-existing Radio Access Technologies (RATs). The parameters for a given CSAT communication scheme may be adapted dynamically based on received signals for a native RAT to be protected and an identification of how that RAT is utilizing a shared resource such as an unlicensed band. To better associate received signaling with the native RAT and distinguish it from other RAT signaling as well as noise, a particular transceiver operating in accordance with the native RAT may be used to receive the signals (rather than a transceiver operating in accordance with another RAT that scans for aggregate background signal strength). For example, for a shared Wi-Fi medium, a co-located Wi-Fi radio may sniff the medium for Wi-Fi packets. Wi-Fi packets may be detected by decoding one or more Wi-Fi signatures and utilization of the Wi-Fi medium may be determined based on the extracted (e.g., decoded) characteristics of the of the detected Wi-Fi packets. Various CSAT cycling parameters defining a corresponding Time Division Multiplexed (TDM) communication pattern may be set or changed as desired based on the identified utilization, such as a duty cycle, a transmit power, cycle timing (e.g., the start/stop time of each CSAT cycle), and so on.

It may be advantageous to align other operations such as Discontinuous Reception (DRX) with the CSAT TDM communication pattern. A DRX broadcast/multicast message is provided for configuring user devices in accordance with various DRX parameters, as an alternative to other (unicast) Radio Resource Control (RRC) signaling. By utilizing such a broadcast/multicast message, a base station may establish different CSAT TDM communication patterns on different frequencies while at the same time configuring DRX to align with each of the different CSAT TDM communication patterns.

The TDM communication patterns may also be staggered in time across the different frequencies with respect to an overlap in their CSAT ON (activated)/CSAT OFF (deactivated) periods, such that user traffic on a particular frequency that is deactivated for a given period may be switched over to another, activated frequency for service during that time. The staggering of TDM communication patterns may be employed across different frequencies for downlink CSAT communication (e.g., transmission by the small cell base station) as well as for uplink CSAT communication (e.g., transmission by a user device).

Channel selection for a co-existing RAT may also be configured to afford further protection to native RATs such as Wi-Fi by preferring operation on secondary channels as opposed to primary channels (if no clean channel is found). In either case, whether a primary or secondary channel is selected, a CSAT communication scheme may be implemented on the selected channel in accordance with the techniques provided herein to afford additional protection to the native RAT.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

FIG. 1 illustrates an example mixed-deployment wireless communication system, in which small cell base stations are deployed in conjunction with and to supplement the coverage of macro cell base stations. As used herein, small cells generally refer to a class of low-powered base stations that may include or be otherwise referred to as femto cells, pico cells, micro cells, etc. As noted in the background above, they may be deployed to provide improved signaling, incremental capacity growth, richer user experience, and so on.

The illustrated wireless communication system 100 is a multiple-access system that is divided into a plurality of cells 102 and configured to support communication for a number of users. Communication coverage in each of the cells 102 is provided by a corresponding base station 110, which interacts with one or more user devices 120 via DownLink (DL) and/or UpLink (UL) connections. In general, the DL corresponds to communication from a base station to a user device, while the UL corresponds to communication from a user device to a base station.

As will be described in more detail below, these different entities may be variously configured in accordance with the teachings herein to provide or otherwise support the CSAT and related operations discussed briefly above. For example, one or more of the small cell base stations 110 may include a CSAT management module 112, while one or more of the user devices 120 may include a CSAT management module 122.

As used herein, the terms "user device" and "base station" are not intended to be specific or otherwise limited to any particular Radio Access Technology (RAT), unless otherwise noted. In general, such user devices may be any wireless communication device (e.g., a mobile phone, router, personal computer, server, etc.) used by a user to communicate over a communications network, and may be alternatively referred to in different RAT environments as an Access Terminal (AT), a Mobile Station (MS), a Subscriber Station (STA), a User Equipment (UE), etc. Similarly, a base station may operate according to one of several RATs in communication with user devices depending on the network in which it is deployed, and may be alternatively referred to as an Access Point (AP), a Network Node, a NodeB, an evolved NodeB (eNB), etc. In addition, in some systems a base station may provide purely edge node signaling functions while in other systems it may provide additional control and/or network management functions.

Returning to FIG. 1, the different base stations 110 include an example macro cell base station 110A and two example small cell base stations 110B, 110C. The macro cell base station 110A is configured to provide communication coverage within a macro cell coverage area 102A, which may cover a few blocks within a neighborhood or several square miles in a rural environment. Meanwhile, the small cell base stations 110B, 110C are configured to provide communication coverage within respective small cell coverage areas 102B, 102C, with varying degrees of overlap existing among the different coverage areas. In some systems, each cell may be further divided into one or more sectors (not shown).

Turning to the illustrated connections in more detail, the user device 120A may transmit and receive messages via a wireless link with the macro cell base station 110A, the message including information related to various types of communication (e.g., voice, data, multimedia services, associated control signaling, etc.). The user device 120B may similarly communicate with the small cell base station 110B via another wireless link, and the user device 120C may similarly communicate with the small cell base station 110C via another wireless link. In addition, in some scenarios, the user device 120C, for example, may also communicate with the macro cell base station 110A via a separate wireless link in addition to the wireless link it maintains with the small cell base station 110C.

As is further illustrated in FIG. 1, the macro cell base station 110A may communicate with a corresponding wide area or external network 130, via a wired link or via a wireless link, while the small cell base stations 110B, 110C may also similarly communicate with the network 130, via their own wired or wireless links. For example, the small cell base stations 110B, 110C may communicate with the network 130 by way of an Internet Protocol (IP) connection, such as via a Digital Subscriber Line (DSL, e.g., including Asymmetric DSL (ADSL), High Data Rate DSL (HDSL), Very High Speed DSL (VDSL), etc.), a TV cable carrying IP traffic, a Broadband over Power Line (BPL) connection, an Optical Fiber (OF) cable, a satellite link, or some other link.

The network 130 may comprise any type of electronically connected group of computers and/or devices, including, for example, Internet, Intranet, Local Area Networks (LANs), or Wide Area Networks (WANs). In addition, the connectivity to the network may be, for example, by remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), Bluetooth (IEEE 802.15.1), or some other connection. As used herein, the network 130 includes network variations such as the public Internet, a private network within the Internet, a secure network within the Internet, a private network, a public network, a value-added network, an intranet, and the like. In certain systems, the network 130 may also comprise a Virtual Private Network (VPN).

Accordingly, it will be appreciated that the macro cell base station 110A and/or either or both of the small cell base stations 110B, 110C may be connected to the network 130 using any of a multitude of devices or methods. These connections may be referred to as the "backbone" or the "backhaul" of the network, and may in some implementations be used to manage and coordinate communications between the macro cell base station 110A, the small cell base station 110B, and/or the small cell base station 110C. In this way, as a user device moves through such a mixed communication network environment that provides both macro cell and small cell coverage, the user device may be served in certain locations by macro cell base stations, at other locations by small cell base stations, and, in some scenarios, by both macro cell and small cell base stations.

For their wireless air interfaces, each base station 110 may operate according to one of several RATs depending on the network in which it is deployed. These networks may include, for example, Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. The terms "network" and "system" are often used interchangeably. A CDMA network may implement a RAT such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a RAT such as Global System for Mobile Communications (GSM). An OFDMA network may implement a RAT such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). cdma2000 is described in documents from an organization named "3rd Generation Partnership Project 2" (3GPP2). These documents are publicly available.

For illustration purposes, an example downlink and uplink frame structure for an LTE signaling scheme is described below with reference to FIGS. 2-3.

Figure 2:
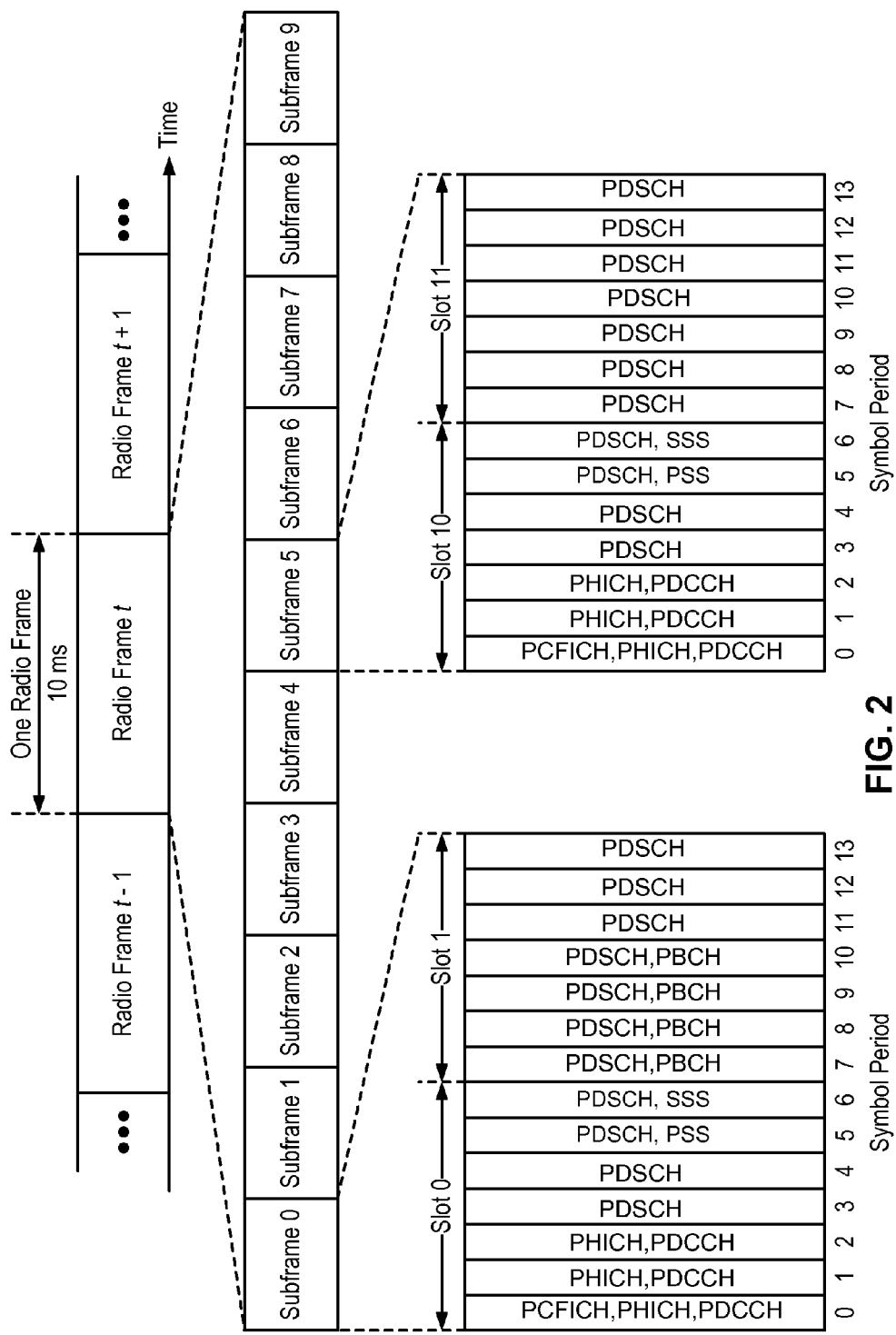
FIG. 2 is a block diagram illustrating an example downlink frame structure for LTE communications.

FIG. 2 is a block diagram illustrating an example downlink frame structure for LTE communications. In LTE, the base stations 110 of FIG. 1 are generally referred to as eNBs and the user devices 120 are generally referred to as UEs. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a Primary Synchronization Signal (PSS) and a Secondary Synchronization Signal (SSS) for each cell in the eNB. The PSS and SSS may be sent in symbol periods 5 and 6, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

Reference signals are transmitted during the first and fifth symbol periods of each slot when the normal cyclic prefix is used and during the first and fourth symbol periods when the extended cyclic prefix is used. For example, the eNB may send a Cell-specific Reference Signal (CRS) for each cell in the eNB on all component carriers. The CRS may be sent in symbols 0 and 4 of each slot in case of the normal cyclic prefix, and in symbols 0 and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support Hybrid Automatic Repeat Request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into Resource Element Groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 3:
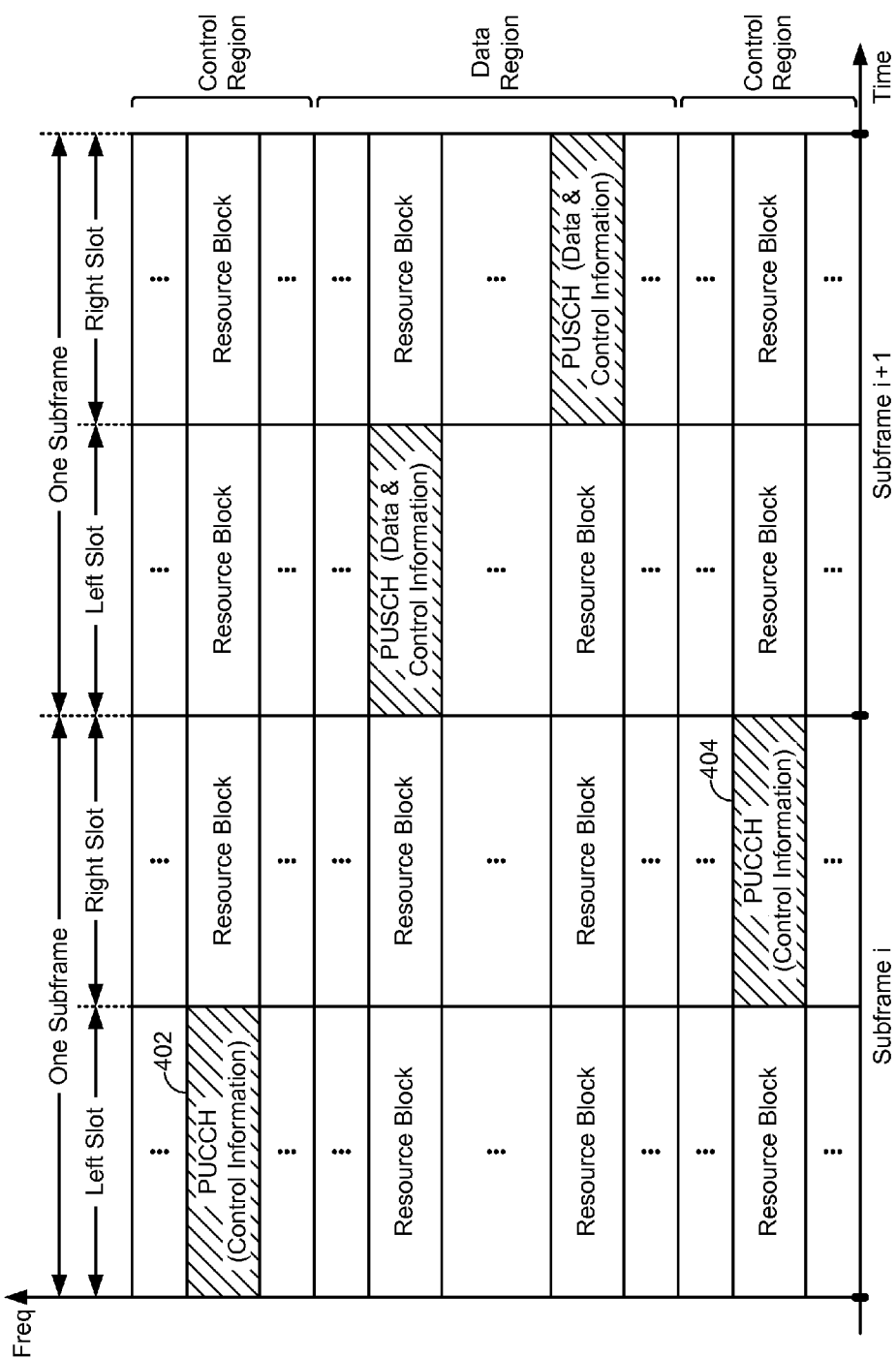
FIG. 3 is a block diagram illustrating an example uplink frame structure for LTE communications.

FIG. 3 is a block diagram illustrating an example uplink frame structure for LTE communications. The available resource blocks (which may be referred to as RBs) for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3.

Returning to FIG. 1, cellular systems such as LTE are typically confined to one or more licensed frequency bands that have been reserved for such communications (e.g., by a government entity such as the Federal Communications Commission (FCC) in the United States). However, certain communication systems, in particular those employing small cell base stations as in the design of FIG. 1, have extended cellular operations into unlicensed frequency bands such as the Unlicensed National Information Infrastructure (U-NII) band used by Wireless Local Area Network (WLAN) technologies. For illustration purposes, the description below may refer in some respects to an LTE system operating on an unlicensed band by way of example when appropriate, although it will be appreciated that such descriptions are not intended to exclude other cellular communication technologies. LTE on an unlicensed band may also be referred to herein as LTE/LTE-Advanced in unlicensed spectrum, or simply LTE in the surrounding context. With reference to FIGS. 2-3 above, the PSS, SSS, CRS, PBCH, PUCCH, and PUSCH in LTE on an unlicensed band are otherwise the same or substantially the same as in the LTE standard described in 3GPP TS 36.211, entitled "Evolved Universal Terrestrial Radio Access (E-UTRA); Physical Channels and Modulation," which is publicly available.

The unlicensed spectrum may be employed by cellular systems in different ways. For example, in some systems, the unlicensed spectrum may be employed in a standalone configuration, with all carriers operating exclusively in an unlicensed portion of the wireless spectrum (e.g., LTE Standalone). In other systems, the unlicensed spectrum may be employed in a manner that is supplemental to licensed band operation by utilizing one or more unlicensed carriers operating in the unlicensed portion of the wireless spectrum in conjunction with an anchor licensed carrier operating in the licensed portion of the wireless spectrum (e.g., LTE Supplemental DownLink (SDL)). In either case, carrier aggregation may be employed to manage the different component carriers, with one carrier serving as the Primary Cell (PCell) for the corresponding user (e.g., an anchor licensed carrier in LTE SDL or a designated one of the unlicensed carriers in LTE Standalone) and the remaining carriers serving as respective Secondary Cells (SCells). In this way, the PCell may provide a Frequency Division Duplexed (FDD) pair of downlink and uplink carriers (licensed or unlicensed), with each SCell providing additional downlink capacity as desired.

The extension of small cell operation into unlicensed frequency bands such as the U-NII (5 GHz) band may therefore be implemented in a variety of ways and increase the capacity of cellular systems such as LTE. As discussed briefly in the background above, however, it may also encroach on the operations of other "native" RATs that typically utilize the same unlicensed band, most notably IEEE 802.11x WLAN technologies generally referred to as "Wi-Fi."

In some small cell base station designs, the small cell base station may include such a native RAT radio co-located with its cellular radio. According to various aspects described herein, the small cell base station may leverage the co-located radio to facilitate co-existence between the different RATs when operating on a shared unlicensed band. For example, the co-located radio may be used to conduct different measurements on the unlicensed band and dynamically determine the extent to which the unlicensed band is being utilized by devices operating in accordance with the native RAT. The cellular radio's use of the shared unlicensed band may then be specially adapted to balance the desire for efficient cellular operation against the need for stable co-existence.

Figure 4:
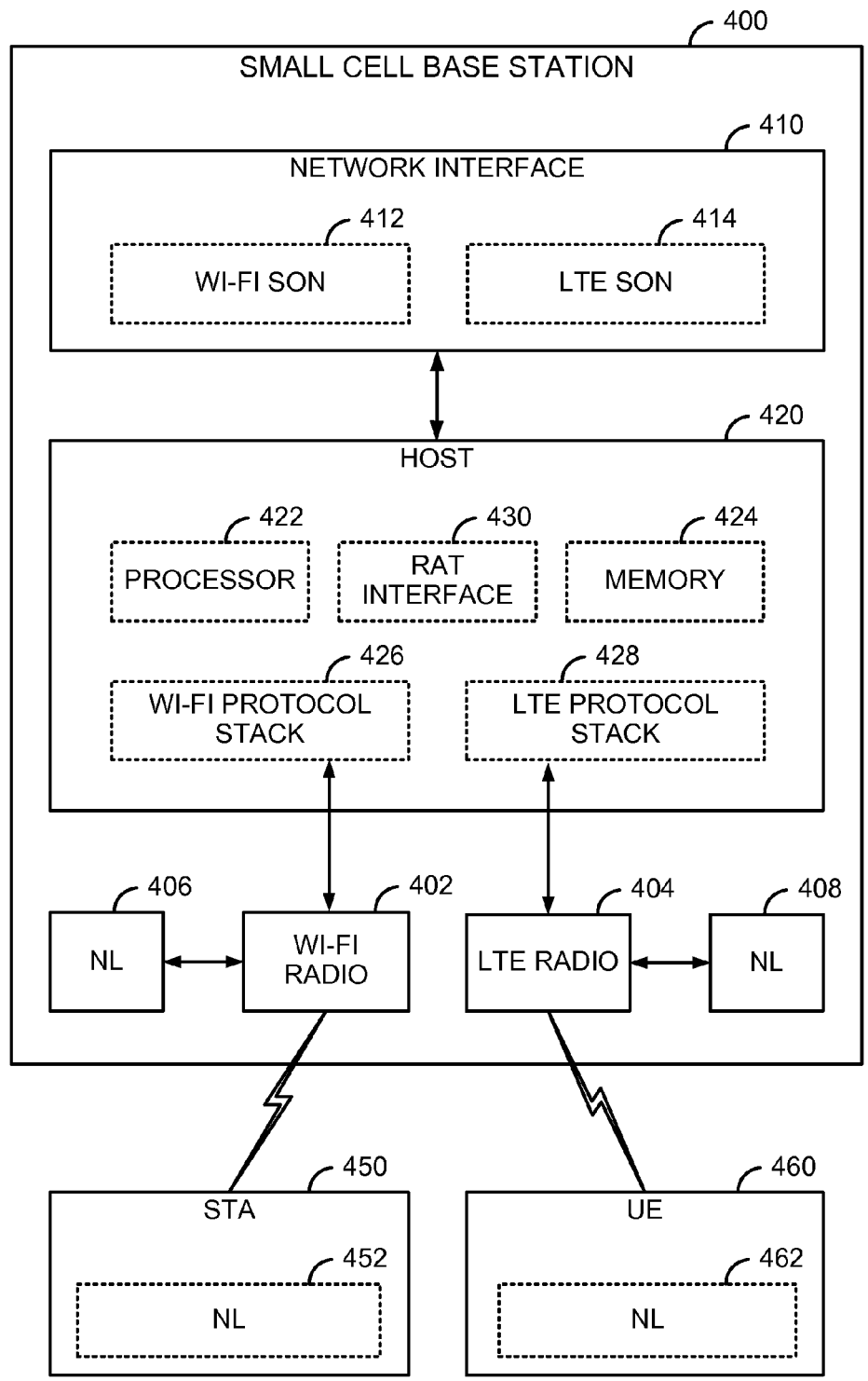
FIG. 4 illustrates an example small cell base station with co-located radio components (e.g., LTE and Wi-Fi) configured for unlicensed spectrum operation.

FIG. 4 illustrates an example small cell base station with co-located radio components configured for unlicensed spectrum operation. The small cell base station 400 may correspond, for example, to one of the small cell base stations 110B, 110C illustrated in FIG. 1. In this example, the small cell base station 400 is configured to provide a WLAN air interface (e.g., in accordance with an IEEE 802.11x protocol) in addition to a cellular air interface (e.g., in accordance with an LTE protocol). For illustration purposes, the small cell base station 400 is shown as including an 802.11x radio component/module (e.g., transceiver) 402 co-located with an LTE radio component/module (e.g., transceiver) 404.

As used herein, the term co-located (e.g., radios, base stations, transceivers, etc.) may include in accordance with various aspects, one or more of, for example: components that are in the same housing; components that are hosted by the same processor; components that are within a defined distance of one another; and/or components that are connected via an interface (e.g., an Ethernet switch) where the interface meets the latency requirements of any required inter-component communication (e.g., messaging). In some designs, the advantages discussed herein may be achieved by adding a radio component of the native unlicensed band RAT of interest to a given cellular small cell base station without that base station necessarily providing corresponding communication access via the native unlicensed band RAT (e.g., adding a Wi-Fi chip or similar circuitry to an LTE small cell base station). If desired, a low functionality Wi-Fi circuit may be employed to reduce costs (e.g., a Wi-Fi receiver simply providing low-level sniffing).

Returning to FIG. 4, the Wi-Fi radio 402 and the LTE radio 404 may perform monitoring of one or more channels (e.g., on a corresponding carrier frequency) to perform various corresponding operating channel or environment measurements (e.g., CQI, RSSI, RSRP, or other RLM measurements) using corresponding Network/Neighbor Listen (NL) modules 406 and 408, respectively, or any other suitable component(s).

The small cell base station 400 may communicate with one or more user devices via the Wi-Fi radio 402 and the LTE radio 404, illustrated as an STA 450 and a UE 460, respectively. Similar to the Wi-Fi radio 402 and the LTE radio 404, the STA 450 includes a corresponding NL module 452 and the UE 460 includes a corresponding NL module 462 for performing various operating channel or environment measurements, either independently or under the direction of the Wi-Fi radio 402 and the LTE radio 404, respectively. In this regard, the measurements may be retained at the STA 450 and/or the UE 460, or reported to the Wi-Fi radio 402 and the LTE radio 404, respectively, with or without any pre-processing being performed by the STA 450 or the UE 460.

While FIG. 4 shows a single STA 450 and a single UE 460 for illustration purposes, it will be appreciated that the small cell base station 400 can communicate with multiple STAs and/or UEs. Additionally, while FIG. 4 illustrates one type of user device communicating with the small cell base station 400 via the Wi-Fi radio 402 (i.e., the STA 450) and another type of user device communicating with the small cell base station 400 via the LTE radio 404 (i.e., the UE 460), it will be appreciated that a single user device (e.g., a smartphone) may be capable of communicating with the small cell base station 400 via both the Wi-Fi radio 402 and the LTE radio 404, either simultaneously or at different times.

As is further illustrated in FIG. 4, the small cell base station 400 may also include a network interface 410, which may include various components for interfacing with corresponding network entities (e.g., Self-Organizing Network (SON) nodes), such as a component for interfacing with a Wi-Fi SON 412 and/or a component for interfacing with an LTE SON 414. The small cell base station 400 may also include a host 420, which may include one or more general purpose controllers or processors 422 and memory 424 configured to store related data and/or instructions. The host 420 may perform processing in accordance with the appropriate RAT(s) used for communication (e.g., via a Wi-Fi protocol stack 426 and/or an LTE protocol stack 428), as well as other functions for the small cell base station 400. In particular, the host 420 may further include a RAT interface 430 (e.g., a bus or the like) that enables the radios 402 and 404 to communicate with one another via various message exchanges.

Figure 5:
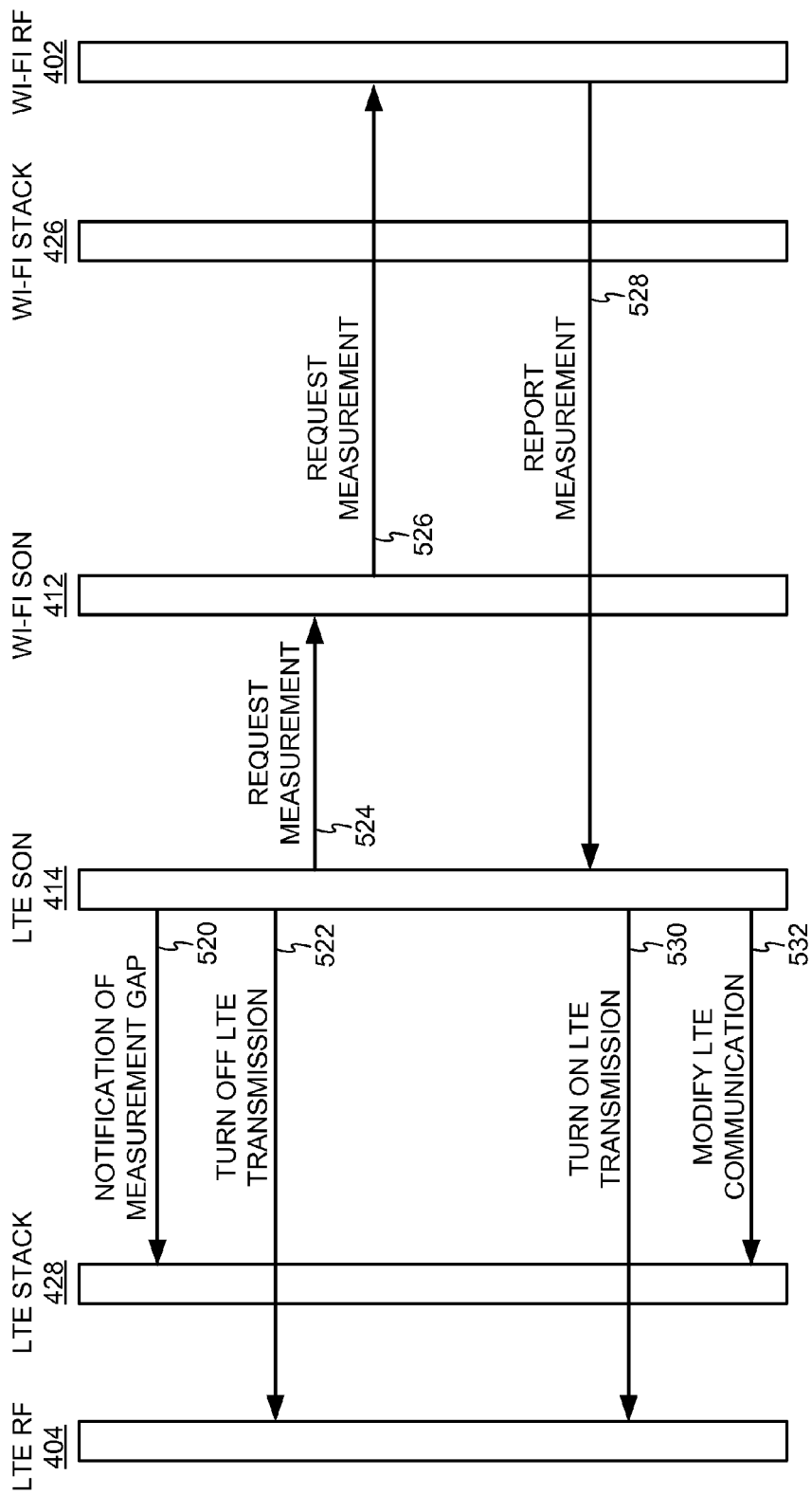
FIG. 5 is a signaling flow diagram illustrating an example message exchange between co-located radios.

FIG. 5 is a signaling flow diagram illustrating an example message exchange between co-located radios. In this example, one RAT (e.g., LTE) requests a measurement from another RAT (e.g., Wi-Fi) and opportunistically ceases transmission for the measurement. FIG. 5 will be explained below with continued reference to FIG. 4.

Initially, the LTE SON 414 notifies the LTE stack 428 via a message 520 that a measurement gap is upcoming on the shared unlicensed band. The LTE SON 414 then sends a command 522 to cause the LTE radio (RF) 404 to temporarily turn off transmission on the unlicensed band, in response to which the LTE radio 404 disables the appropriate RF components for a period of time (e.g., so as to not interfere with any measurements during this time).

The LTE SON 414 also sends a message 524 to the co-located Wi-Fi SON 412 requesting that a measurement be taken on the unlicensed band. In response, the Wi-Fi SON 412 sends a corresponding request 526 via the Wi-Fi stack 426 to the Wi-Fi radio 402, or some other suitable Wi-Fi radio component (e.g., a low cost, reduced functionality Wi-Fi receiver).

After the Wi-Fi radio 402 conducts measurements for Wi-Fi related signaling on the unlicensed band, a report 528 including the results of the measurements is sent to the LTE SON 414 via the Wi-Fi stack 426 and the Wi-Fi SON 412. In some instances, the measurement report may include not only measurements performed by the Wi-Fi radio 402 itself, but also measurements collected by the Wi-Fi radio 402 from the STA 450. The LTE SON 414 may then send a command 530 to cause the LTE radio 404 to turn back on transmission on the unlicensed band (e.g., at the end of the defined period of time).

The information included in the measurement report (e.g., information indicative of how Wi-Fi devices are utilizing the unlicensed band) may be compiled along with various LTE measurements and measurement reports. Based on information about the current operating conditions on the shared unlicensed band (e.g., as collected by one or a combination of the Wi-Fi radio 402, the LTE radio 404, the STA 450, and/or the UE 460), the small cell base station 400 may specially adapt different aspects of its cellular operations in order to manage co-existence between the different RATs. Returning to FIG. 5, the LTE SON 414, for example, may then send a message 532 that informs the LTE stack 428 how LTE communication is to be modified.

There are several aspects of cellular operation that may be adapted in order to manage co-existence between the different RATs. For example, the small cell base station 400 may select certain carriers as preferable when operating in the unlicensed band, may opportunistically enable or disable operation on those carriers, may selectively adjust the transmission power of those carriers, if necessary (e.g., periodically or intermittently in accordance with a transmission pattern), and/or take other steps to balance the desire for efficient cellular operation against the need for stable co-existence.

Figure 6:
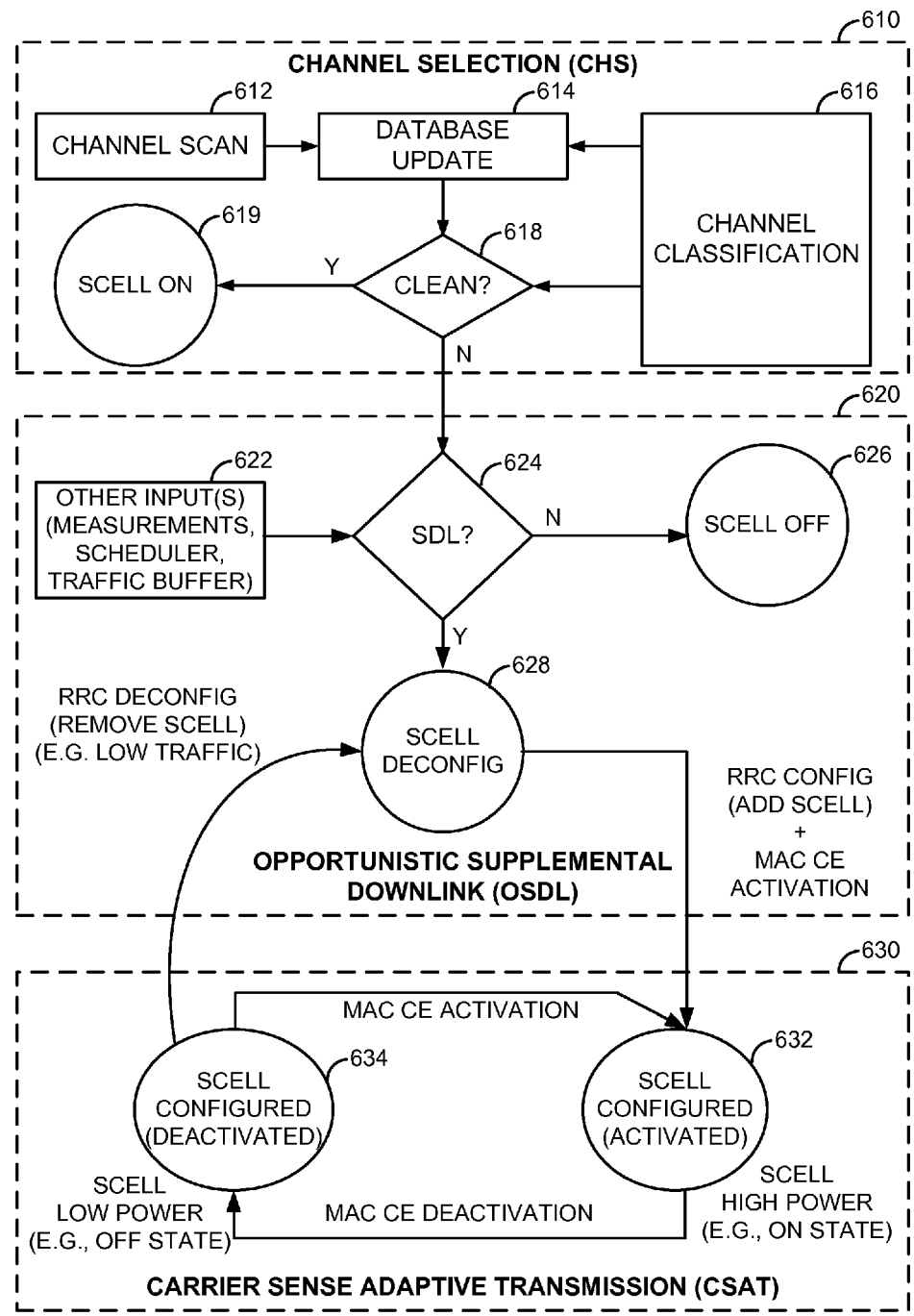
FIG. 6 is a system-level co-existence state diagram illustrating different aspects of cellular operation that may be specially adapted to manage co-existence between different Radio Access Technologies (RATs) operating on a shared unlicensed band.

FIG. 6 is a system-level co-existence state diagram illustrating different aspects of cellular operation that may be specially adapted to manage co-existence between different RATs operating on a shared unlicensed band. As shown, the techniques in this example include operations that will be referred to herein as Channel Selection (CHS) where appropriate unlicensed carriers are analyzed, Opportunistic Supplemental Downlink (OSDL) where operation on one or more corresponding SCells is configured or deconfigured, and Carrier Sense Adaptive Transmission (CSAT) where the transmission power on those SCells is adapted, if necessary, by cycling between periods of high transmission power (e.g., an ON state, as a special case) and low transmission power (e.g., an OFF state, as a special case).

For CHS (block 610), a channel selection algorithm may perform certain periodic or event-driven scanning procedures (e.g., initial or threshold triggered) (block 612). With reference to FIG. 4, the scanning procedures may utilize, for example, one or a combination of the Wi-Fi radio 402, the LTE radio 404, the STA 450, and/or the UE 460. The scan results may be stored (e.g., over a sliding time window) in a corresponding database (block 614) and used to classify the different channels in terms of their potential for cellular operation (block 616). For example, a given channel may be classified, at least in part, based on whether it is a clean channel or whether it will need to be afforded some level of protection for co-channel communications. Various cost functions and associated metrics may be employed in the classification and related calculations.

If a clean channel is identified ('yes' at decision 618), a corresponding SCell may be operated without concern for impacting co-channel communications (state 619). On the other hand, if no clean channel is identified, further processing may be utilized to reduce the impact on co-channel communications ('no' at decision 618), as described below.

Turning to OSDL (block 620), input may be received from the channel selection algorithm as well as from other sources, such as various measurements, schedulers, traffic buffers, etc. (block 622), to determine whether unlicensed operation is warranted without a clean channel being available (decision 624). For example, if there is not enough traffic to support a secondary carrier in the unlicensed band ('no' at decision 624), the corresponding SCell that supports it may be disabled (state 626). Conversely, if there is a substantial amount of traffic ('yes' at decision 624), even though a clean channel is not available, an SCell may nevertheless be constructed from one or more of the remaining carriers by invoking CSAT operation (block 630) to mitigate the potential impact on co-existence.

Returning to FIG. 6, the SCell may be initially enabled in a deconfigured state (state 628). The SCell along with one or more corresponding user devices may then be configured and activated (state 630) for normal operation. In LTE, for example, an associated UE may be configured and deconfigured via corresponding RRC Config/Deconfig messages to add the SCell to its active set. Activation and deactivation of the associated UE may be performed, for example, by using Medium Access Control (MAC) Control Element (CE) Activation/Deactivation commands. At a later time, when the traffic level drops below a threshold, for example, an RRC Deconfig message may be used to remove the SCell from the UE's active set, and return the system to the deconfigured state (state 628). If all UEs are deconfigured, OSDL may be invoked to turn the SCell off.

During CSAT operation (block 630), the SCell may remain configured but be cycled between periods of activated operation (state 632) and periods of deactivated operation (state 634) in accordance with a (long-term) Time Division Multiplexed (TDM) communication pattern. In the configured/activated state (state 632), the SCell may operate at relatively high power (e.g., full powered ON state). In the configured/deactivated state (state 634), the SCell may operate at a reduced, relatively low power (e.g., depowered OFF state).

Figure 7:
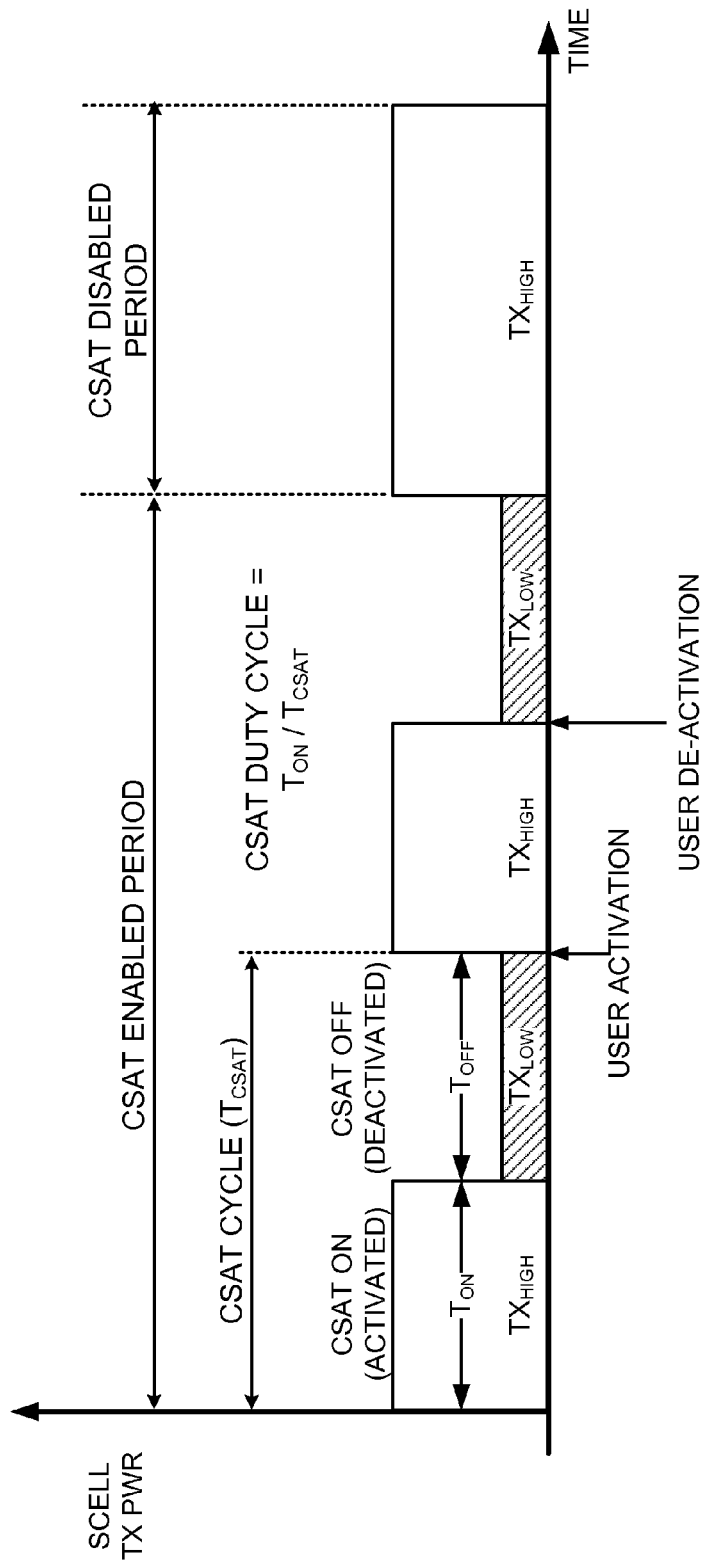
FIG. 7 illustrates in more detail certain aspects a Carrier Sense Adaptive Transmission (CSAT) communication scheme for cycling cellular operation in accordance with a long-term Time Division Multiplexed (TDM) communication pattern.

FIG. 7 illustrates in more detail certain aspects a CSAT communication scheme for cycling cellular operation in accordance with a long-term TDM communication pattern. As discussed above in relation to FIG. 6, CSAT may be selectively enabled on one or more SCells as appropriate to facilitate co-existence in unlicensed spectrum, even when a clean channel free of competing RAT operation is not available.

When enabled, SCell operation is cycled between CSAT ON (activated) periods and CSAT OFF (deactivated) periods within a given CSAT cycle ($T_{CSAT}$). One or more associated user devices may be similarly cycled between corresponding MAC activated and MAC deactivated periods. During an associated activated period of time $T_{ON}$, SCell transmission on the unlicensed band may proceed at a normal, relatively high transmission power. During an associated deactivated period of time $T_{OFF}$, however, the SCell remains in a configured state but transmission on the unlicensed band is reduced or even fully disabled to yield the medium to a competing RAT (as well as to perform various measurements via a co-located radio of the competing RAT).

Each of the associated CSAT parameters, including, for example, the CSAT pattern duty cycle (i.e., $T_{ON}/T_{CSAT}$), cycle timing (e.g., the start/stop time of each CSAT cycle), and the relative transmission powers during activated/deactivated periods, may be adapted based on the current signaling conditions to optimize CSAT operation. As an example, if the utilization of a given channel by Wi-Fi devices is high, an LTE radio may adjust one or more of the CSAT parameters such that usage of the channel by the LTE radio is reduced. For example, the LTE radio may reduce its transmit duty cycle or transmit power on the channel. Conversely, if utilization of a given channel by Wi-Fi devices is low, an LTE radio may adjust one or more of the CSAT parameters such that usage of the channel by the LTE radio is increased. For example, the LTE radio may increase its transmit duty cycle or transmit power on the channel. In either case, the CSAT ON (activated) periods may be made sufficiently long (e.g., greater than or equal to about 200 msec) to provide user devices with a sufficient opportunity to perform at least one measurement during each CSAT ON (activated) period.

A CSAT scheme as provided herein may offer several advantages for mixed RAT co-existence, particular in unlicensed spectrum. For example, by adapting communication based on signals associated with a first RAT (e.g., Wi-Fi), a second RAT (e.g., LTE) may react to utilization of a co-channel by devices that use the first RAT while refraining from reacting to extraneous interference by other devices (e.g., non-Wi-Fi devices) or adjacent channels. As another example, a CSAT scheme enables a device that uses one RAT to control how much protection is to be afforded to co-channel communications by devices that use another RAT by adjusting the particular parameters employed. In addition, such a scheme may be generally implemented without changes to the underlying RAT communication protocol. In an LTE system, for example, CSAT may be generally implemented without changing the LTE PHY or MAC layer protocols, but by simply changing the LTE software.

To improve overall system efficiency, the CSAT cycle may be synchronized, in whole or in part, across different small cells, at least within a given operator. For example, the operator may set a minimum CSAT ON (activated) period ($T_{ON,min}$) and a minimum CSAT OFF (deactivated) period ($T_{OFF,min}$). Accordingly, the CSAT ON (activated) period durations and transmission powers may be different, but minimum deactivation times and certain channel selection measurement gaps may be synchronized.

Figure 8:
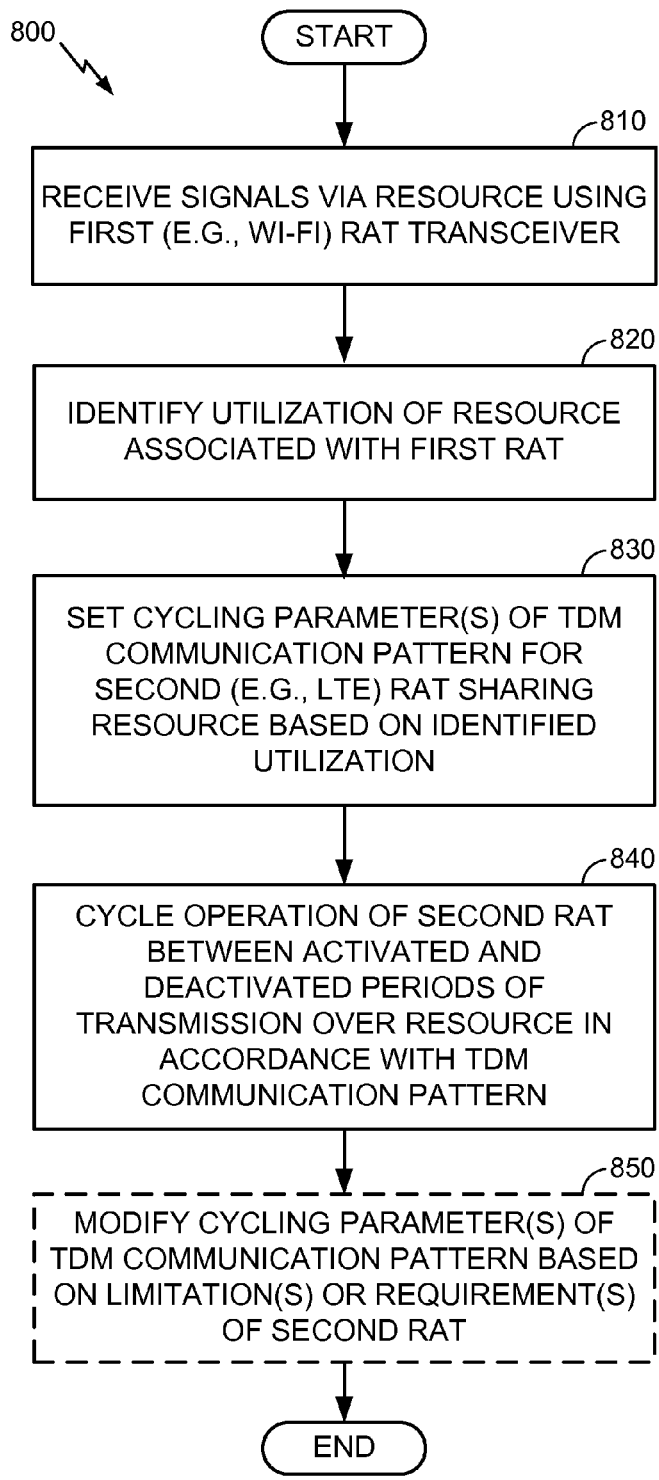
FIG. 8 is a flow diagram illustrating an example method of CSAT parameter adaptation for reducing interference between RATs.

FIG. 8 is a flow diagram illustrating an example method of CSAT parameter adaptation for reducing interference between RATs. The method may be performed, for example, in whole or in part, by a small cell base station (e.g., the small cell base station 110C illustrated in FIG. 1) and/or by a user device (e.g., the user device 120C illustrated in FIG. 1).

As shown, the method 800 may include receiving signals via a resource using a first (e.g., Wi-Fi) RAT (block 810). The resource may include or otherwise correspond to, for example, an unlicensed radio frequency band shared by Wi-Fi and LTE devices. To better associate received signaling with the first RAT and distinguish it from other RAT signaling as well as noise, a particular transceiver operating in accordance with the first RAT may be used to receive the signals (rather than a transceiver operating in accordance with another RAT that scans for aggregate background signal strength). The term "transceiver" as used herein may refer to different types of transmission and/or reception components, and is not intended to imply that such components are necessarily capable of both transmission and reception. As discussed above, such a transceiver may include a fully-functioning transmission/reception radio or a lower functionality receiver circuit, and may be co-located with another transceiver operating in accordance with another RAT.

The small cell base station and/or user device may then identify a utilization of the resource that is associated with the first RAT based on the received signals (block 820). Utilization of the resource may give an indication of an amount of interference (e.g., co-channel interference) that is associated with first RAT signaling. Based on the identified utilization of the resource, one or more cycling parameters may be set for a TDM communication pattern defining CSAT ON (activated) and CSAT OFF (deactivated) periods of transmission for a second (e.g., LTE) RAT sharing the resource (block 830), and operation of the second RAT may be cycled between CSAT ON (activated) and CSAT OFF (deactivated) periods of transmission over the resource in accordance with the TDM communication pattern (block 840). As discussed above, the CSAT OFF (deactivated) periods provide not only opportunities for the first RAT to use the resource but also opportunities to measure first RAT signaling.

Measurements may be conducted on the resource and the resource may be characterized in terms of its utilization in various ways. For example, for a shared Wi-Fi medium, a co-located Wi-Fi radio may sniff the medium for Wi-Fi packets. Wi-Fi packets may be detected by decoding one or more Wi-Fi signatures. Examples of such signatures include Wi-Fi preambles, Wi-Fi PHY headers, Wi-Fi MAC headers, Wi-Fi beacons, Wi-Fi probe requests, Wi-Fi probe responses, and so on. The co-located Wi-Fi radio may then extract various characteristics of the detected Wi-Fi packets. Example characteristics include packet duration, signal strength or energy (e.g., RSSI), traffic type (e.g., high vs. low QoS), Wi-Fi channel type (e.g., primary vs. secondary), and other attributes of the packets related to the impact on or need to prioritize Wi-Fi signaling. The utilization of the Wi-Fi medium may be determined based on the extracted (e.g., decoded) characteristics of the of the detected Wi-Fi packets.

Returning to FIG. 8, setting the cycling parameters (block 830) may comprise changing at least one of the cycling parameters based on a comparison of the identified utilization of the resource with a threshold. For example, a medium utilization metric for the first RAT ($MU_{RAT1}$) may be calculated as a function of the duration D of each detected packet, such that $MU_{RAT1} = \Sigma D_i / T_M$, where $i \in \psi$. Here, $\psi$ is the set of detected packets of the first RAT that have an RSSI above a corresponding level (e.g., $-62$ dBm) and $T_M$ is a normalization factor based on the length of the measurement or observation period (e.g., the $T_{OFF}$ duration for a CSAT OFF (deactivated) period in which measurements are performed). Packets that having a relatively low RSSI may be filtered out of the medium utilization calculation because of the limited impact that operation of the second RAT is likely to have on those packets.

The utilization metric $MU_{RAT1}$ may be compared to a corresponding set of utilization thresholds ($TH_{UTIL}$) associated with a level of protection to be afforded to the first RAT. That is, the utilization threshold(s) $TH_{UTIL}$ may be set (statically or dynamically) to control the amount of protection afforded to the first RAT. For example, if inspection of the detected packets indicates that the packets require a high Quality of Service (QoS) from the first RAT, the utilization threshold(s) $TH_{UTIL}$ may be adjusted downward to increase sensitivity to operation by the first RAT. Conversely, if inspection of the detected packets indicates that the packets do not require a high QoS, the utilization threshold(s) $TH_{UTIL}$ may be adjusted upward to decrease sensitivity to operation by the first RAT.

Various cycling parameters may be set or changed as desired. For example, as discussed in more detail above with respect to FIG. 7, the CSAT cycling parameters may include or otherwise correspond to a duty cycle, a transmit power, cycle timing (e.g., the start/stop time of each CSAT cycle), and so on. Each parameter may be bounded by corresponding max (e.g., $T_{OFF,max}$) and min (e.g., $T_{OFF,min}$) values as appropriate for a given system, and modifications to the cycling parameters may be constrained by a hysteresis parameter (H) to limit undue state oscillations.

As an example, the CSAT OFF (deactivated) period may be increased by a step $\Delta T$ (up to, at most, a specified maximum) if the utilization of the resource $MU_{RAT1}$ by the first RAT exceeds a threshold utilization $TH_{UTIL}$ value, or decreased by a step $\Delta T$ (down to, at most, a specified minimum) if the utilization of the resource $MU_{RAT1}$ falls below a threshold utilization $TH_{UTIL}$ value.

An example algorithm is as follows:

CSAT OFF = min ($T_{OFF,max}$; CSAT OFF + $\Delta T$) if $MU_{RAT1} > TH_{UTIL}$,
CSAT OFF = max ($T_{OFF,min}$; CSAT OFF − $\Delta T$) if $MU_{RAT1} <$ $TH_{UTIL}$ − H,
else CSAT OFF = CSAT OFF.

Accordingly, it will be appreciated that any of the above parameters may be set or adjusted to control how a resource is utilized by competing RATs, based on how much protection is to be provided for one of the RATs.

Returning to FIG. 8, in some designs, the cycling parameters may be further set or modified based on characteristics of the second RAT itself (optional block 850). For example, the small cell base station or user device may determine that there is a traffic or backhaul limitation associated with the second RAT, and modify the cycling parameters based on the determined limitation. If the traffic buffer for the second RAT drops below some threshold for a relatively long time, this may be taken as an indication that the second RAT does not have a high need for the resource at the moment, and steps may be taken to reduce the second RAT's usage of the medium (e.g., by decreasing the CSAT ON (activated) period, increasing the CSAT OFF (deactivated) period, increasing the $T_{OFF,max}$ restriction, and so on). Similar steps may be taken if backhaul limitations restrict the extent to which the second RAT may utilize the resource.

As another example, if the second RAT requires a high QoS on the resource, steps may be taken to increase the second RAT's usage of the resource (e.g., by increasing the CSAT ON (activated) period, decreasing the CSAT OFF (deactivated) period, decreasing the $T_{OFF,max}$ restriction, and so on). Conversely, if the second RAT does not require a high QoS on the resource, steps may be taken to decrease the second RAT's usage of the resource (e.g., by decreasing the CSAT ON (activated) period, increasing the CSAT OFF (deactivated) period, increasing the $T_{OFF,max}$ restriction, and so on).

In some instances, the cycling parameters may be further modified opportunistically, on a more short-term basis, to address as needed any temporary issues that may arise.

Figure 9:
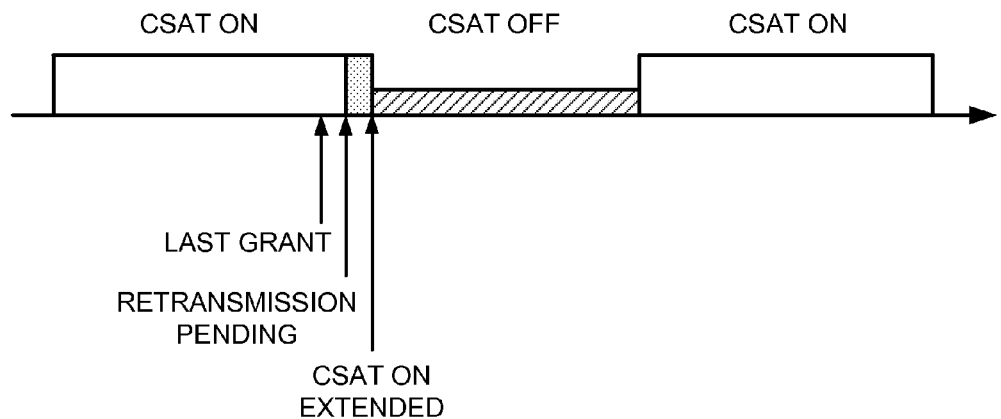
FIG. 9 illustrates an example opportunistic modification of a CSAT communication scheme to accommodate pending retransmissions.

FIG. 9 illustrates an example opportunistic modification of a CSAT communication scheme to accommodate pending retransmissions. As in FIG. 7, during CSAT ON (activated) periods of communication, transmission on a resource such as an unlicensed band is enabled. During CSAT OFF (deactivated) periods, transmission on the resource is disabled to allow other-system operations and to conduct measurements.

As shown in FIG. 9, in some designs, a given CSAT ON (activated) period may be opportunistically extended. For example, the small cell base station may determine that a retransmission procedure (e.g., HARQ) associated with communication on the resource by the second RAT is still pending at or near the edge of a CSAT ON (activated) period. In response, the small cell base station may extend the CSAT ON (activated) period for the second RAT on the resource in order to complete the retransmission procedure. To reduce the usage of this extended CSAT ON (activated) period by other second RAT traffic, however, the small cell base station may stop scheduling (or assigning) new DL grants as the end of the CSAT ON (activated) period approaches.

In some instances, additional operations may be performed over the first RAT to effectuate coordination with the CSAT scheme being employed.

Figure 10:
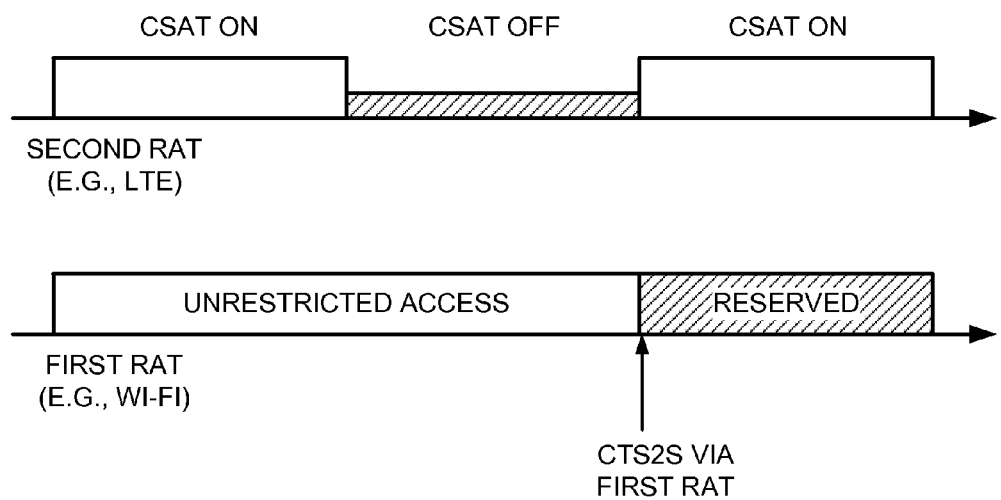
FIG. 10 illustrates an example of inter-RAT coordination utilizing a Clear-to-Send-to-Self (CTS2S) message.

FIG. 10 illustrates an example of inter-RAT coordination utilizing a Clear-to-Send-to-Self (CTS2S) message. As in FIG. 7, during CSAT ON (activated) periods of communication, transmission on a resource such as an unlicensed band is enabled. During CSAT OFF (deactivated) periods, transmission on the resource is disabled to allow other-system operations and to conduct measurements.

As shown in FIG. 10, in some designs, a co-located transceiver operating according to the first (e.g., Wi-Fi) RAT may be used to transmit a CTS2S message on the resource to reserve the resource for a transmission by the second RAT. The CTS2S message may be transmitted before the end of a CSAT OFF (deactivated) period to reserve the resource for the second RAT during the next CSAT ON (activated) period. The CTS2S message may include a duration indication corresponding to the duration of the upcoming CSAT ON (activated) period. The CTS2S message transmission power may be adapted to control its range, as desired (and, hence, the number of affected first RAT devices).

In some instances, the cycling parameter setting and adaptation operations described above may be split between a small cell base station (e.g., the small cell base station 110C illustrated in FIG. 1) and one or more user devices (e.g., the user device 120C illustrated in FIG. 1), with various layers of coordination.

Figure 11:
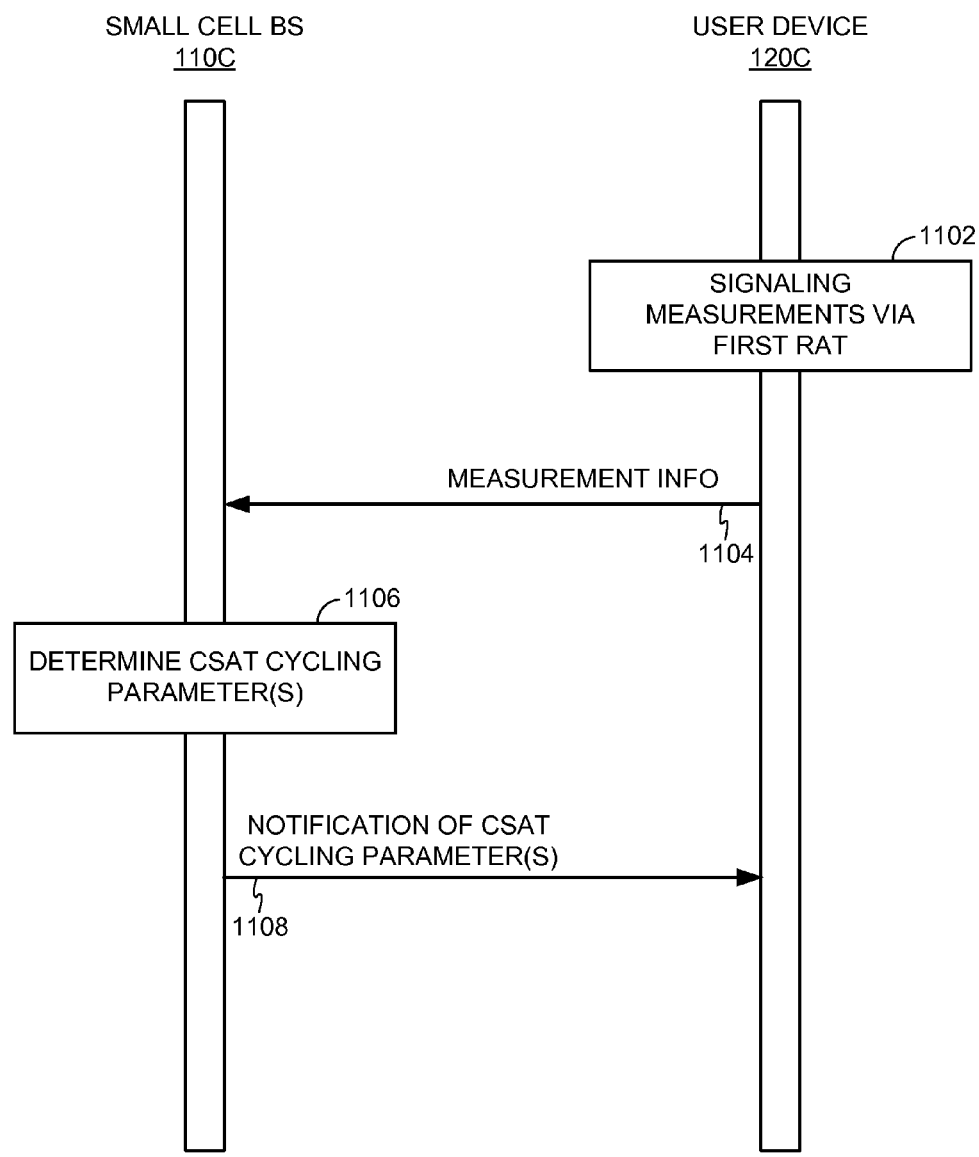
FIGS. 11-12 are signaling flow diagrams illustrating different examples of split processing and message exchanges between a small cell base station and a user device for coordinating CSAT operation.
Figure 12:
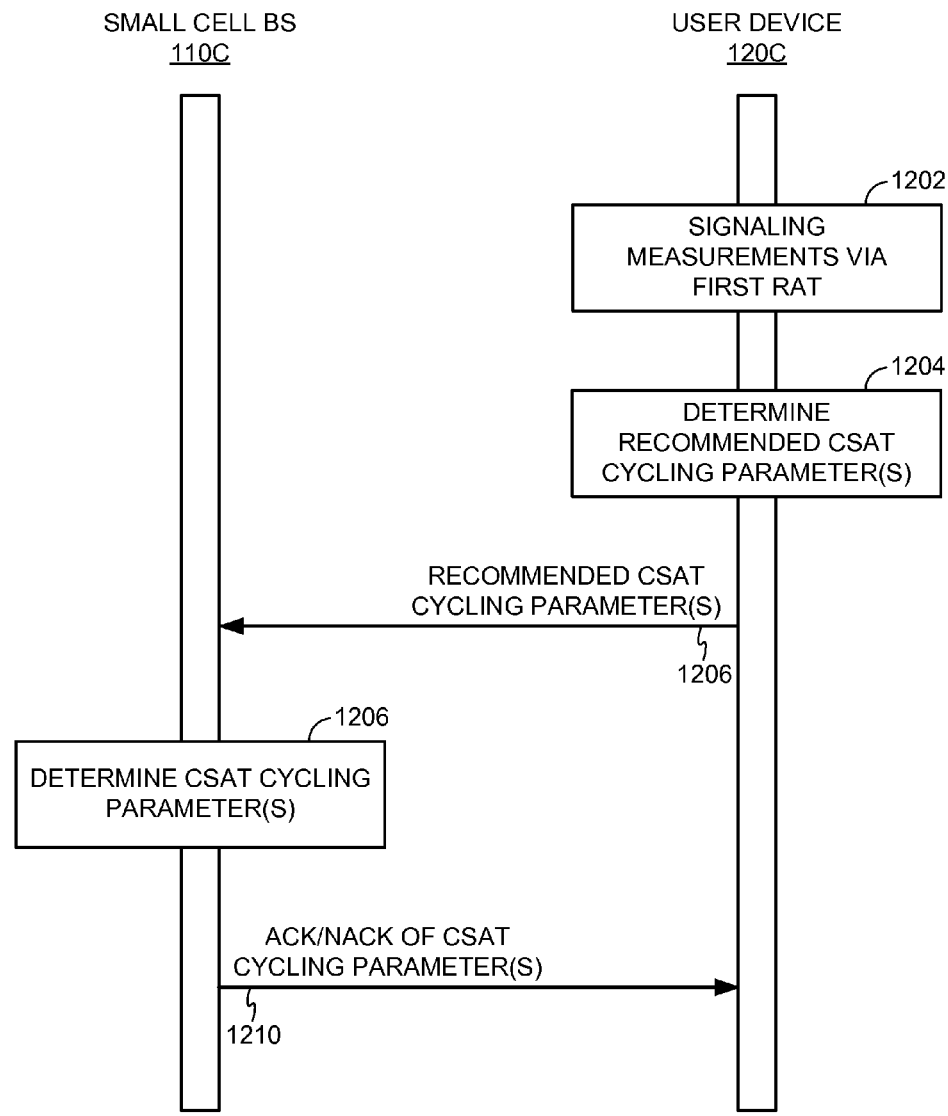

FIGS. 11-12 are signaling flow diagrams illustrating different examples of split processing and message exchanges between a small cell base station and a user device for coordinating CSAT operation. By way of example, the small cell base station is shown as the small cell base station 110C illustrated in FIG. 1 and the user device is shown as the user device 120C illustrated in FIG. 1.

In the example of FIG. 11, the user device performs signaling measurements of a shared resource using a first (e.g., Wi-Fi) RAT (block 1102). The user device then transmits a message 1104 to the small cell base station that includes measurement information indicative of the utilization of the resource. The measurement information may include the measurements themselves or a further processed version thereof, including a utilization metric of the type described above. Based on the measurement information, the small cell base station may determine one or more CSAT cycling parameters (block 1106). The small cell base station then transmits a response message 1108 to the user device that includes the determined cycling parameters.

In the example of FIG. 12, the user device similarly performs signaling measurements of a shared resource using a first (e.g., Wi-Fi) RAT (block 1202). In contrast to the example of FIG. 11, however, the user device itself determines one or more recommended CSAT cycling parameters based on the measurement information (block 1204). The user device then transmits a message 1206 to the small cell base station that includes the recommended CSAT cycling parameters. In response, the small cell base station may make a determination concerning the recommended CSAT cycling parameters (block 1208) and transmit a response message 1210 to the user device that includes an acknowledgement confirming the recommended CSAT cycling parameters, or some form of negative acknowledgement or notification of alternative parameters.

Accordingly, in each of these examples, the user device may transmit a message to the small cell base station that is based on the utilization of the resource and receive a response message that includes (e.g., directly or indirectly via confirmation) one or more cycling parameters. The various message content and corresponding processing operations, however, may vary. In either case, the small cell base station may synchronize (e.g., via the cycling parameters in the response message) cycling of uplink operation of the second RAT by the user device and cycling of downlink operation of the second RAT by the small cell base station. For example, the uplink TDM communication pattern may be selected as a subset of the downlink TDM communication pattern so that uplink communications are only permitted during periods in which the small cell base station is active.

In practice, turning a given RAT such as LTE off during certain periods may impact other operations of the communication system. For example, a user device may attempt to perform various measurements during a CSAT OFF (deactivated) period, such as Carrier-to-Interference (C/I), Reference Signal Received Power (RSRP), Reference Signal Received Quality (RSRQ), and Channel Quality Indicator (CQI) measurements, but will not be able to find the corresponding base station during this time since the base station is not transmitting. This may impact measurement and timing accuracy, tracking loop procedures, cell reselection procedures, etc., and detrimentally affect proper operation of the system. Accordingly, in some designs, the small cell base station can be configured to ignore certain information reported by the user devices for CSAT OFF (deactivated) periods.

Returning again to FIG. 7, the illustrated TDM communication pattern may be applied to not just one frequency (e.g., SCell) but to several different frequencies on which the small cell base station provides communication services. In some instances, the same TDM communication pattern may be applied to all of the different frequencies. However, in other instances, it may be advantageous to apply a different TDM communication pattern to the different frequencies.

Applying different TDM communication patterns to different frequencies may provide flexibility and certain associated advantages. However, CSAT operation across different frequencies and different TDM communication patterns may be impeded by and/or require coordination with other operations of the communication system, such as Discontinuous Deception (DRX).

Figure 13:
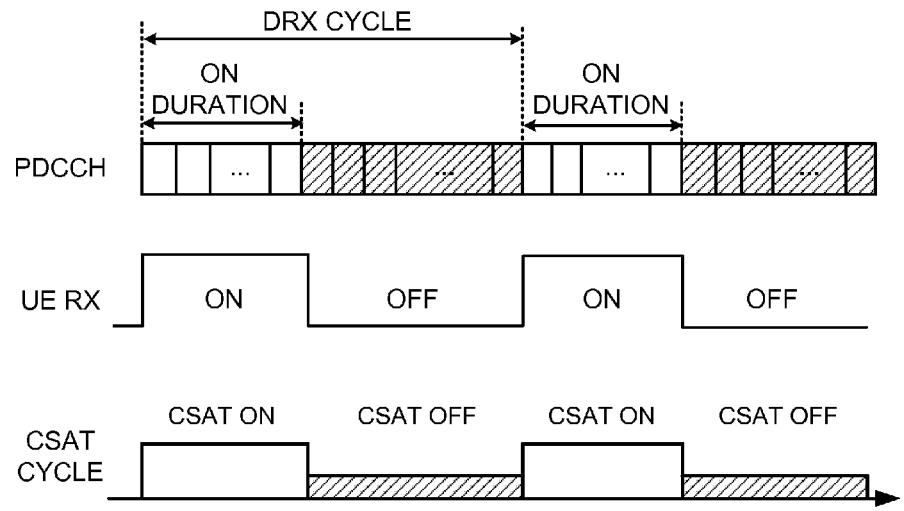
FIG. 13 illustrates an example Discontinuous Reception (DRX) communication mode.

FIG. 13 illustrates an example DRX communication mode, which may be used to communicate with certain user devices (illustrated at LTE UEs) for applications that do not require continuous reception. DRX is generally advantageous in that it allows user devices to conserve battery power by monitoring control channels only at configurable or predetermined intervals rather than continuously.

As shown, during certain predetermined or negotiated times, the user device's receiver (RX) is turned ON (e.g., in a connected state), while at other times, it is turned OFF (referred to as a DRX gap) and the user device enters a low power state. During the ON duration of a given DRX cycle, the user device's receiver may monitor a corresponding Physical Downlink Control Channel (PDCCH) or the like to identify DL data. The base station serving the user device may control or otherwise be aware of the DRX operation, and schedule communications accordingly.

As is further illustrated in FIG. 13, it may be advantageous to align the DRX pattern with the CSAT TDM communication pattern, at least to a certain extent and for certain user devices. For example, the base station may align the DRX pattern of one or more high-traffic user devices (e.g., a user device served in the 5 GHz band, which is generally associated with high traffic) with the CSAT TDM communication pattern to maximize or at least increase the overlap between the DRX ON period and the CSAT ON (activated) period, thereby increasing transmission opportunities and overall throughput for the user devices.

In conventional DRX implementations, however, a single DRX pattern is configured (e.g., through RRC signaling) for each user device across all of its different frequencies (SCells). This conventional implementation prevents simultaneous alignment of DRX with different CSAT TDM communication patterns.

Figure 14:
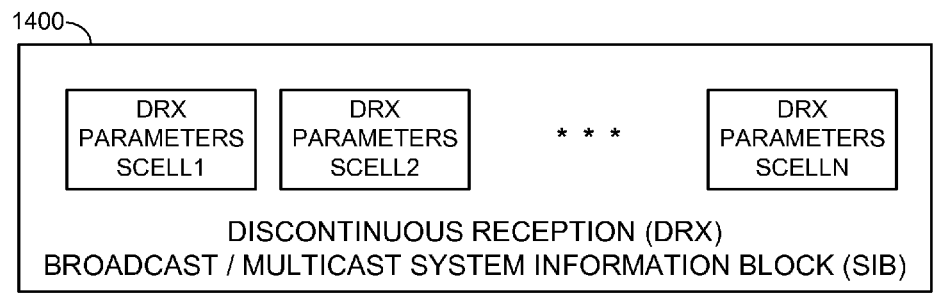
FIG. 14 illustrates an example DRX broadcast/multicast message for configuring user devices in accordance with various DRX parameters.

FIG. 14 illustrates an example DRX broadcast/multicast message for configuring user devices in accordance with various DRX parameters, as an alternative to conventional RRC signaling. In this example, the broadcast/multicast message 1400 is illustrated as a System Information Block (SIB) which may be transmitted by a small cell base station on its PCell to all user devices being served. The broadcast/multicast message 1400 carries respective DRX parameters for each SCell (SCell1, SCell2, . . . , SCellN). The broadcast/multicast message 1400 is accordingly able to specify individual DRX configurations that are different across SCells but common to all user devices. This is in contrast to conventional, user-specific (unicast) RRC messages, which specify DRX configurations that are specific to each user device but common to all SCells on which that user device operates. By utilizing such a broadcast/multicast message, the base station may establish different CSAT TDM communication patterns on different SCells while at the same time configuring DRX to align with each of the different CSAT TDM communication patterns.

Figure 15:
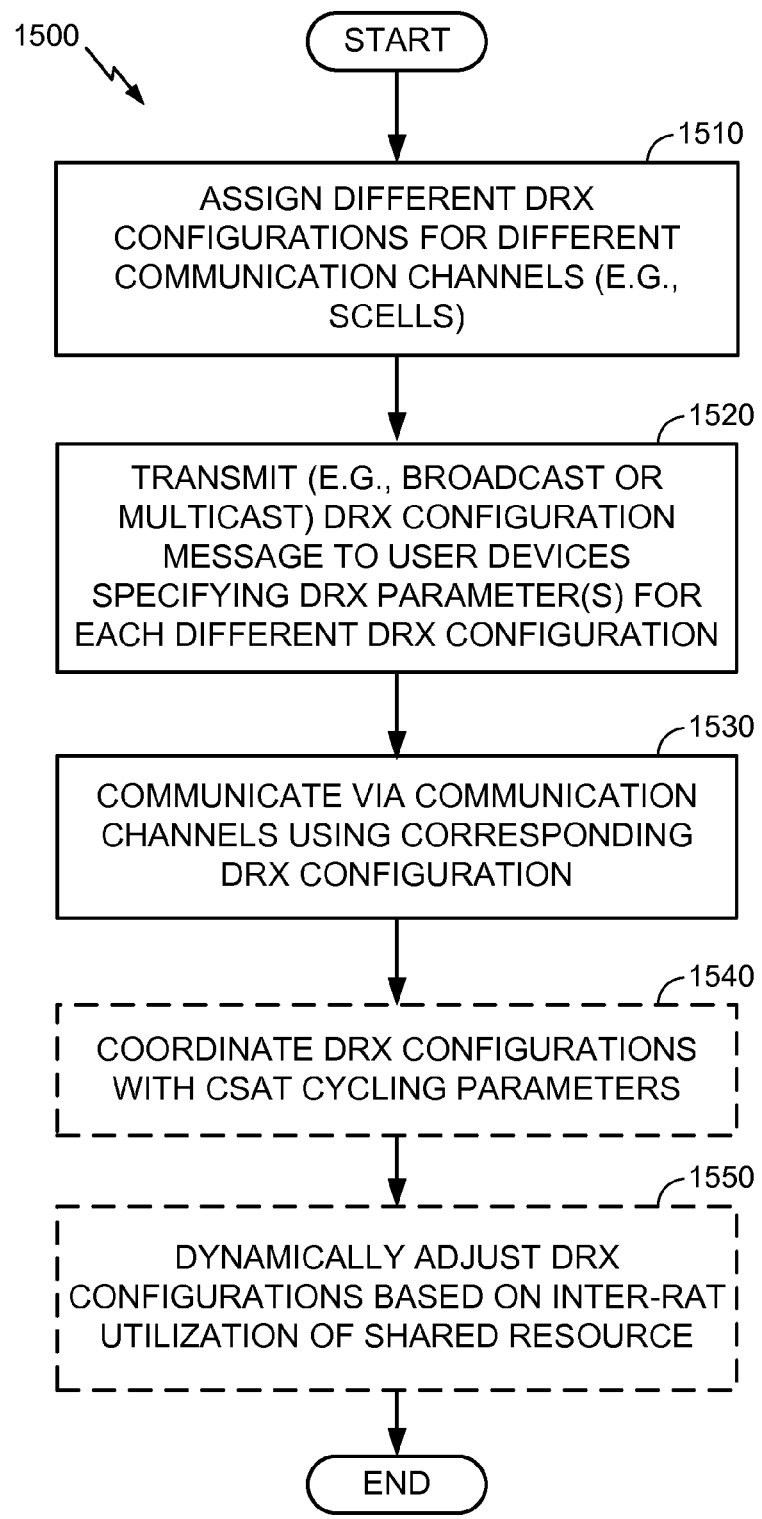
FIG. 15 is a flow diagram illustrating an example method of coordinating DRX configurations across user devices in a wireless communication system.

FIG. 15 is a flow diagram illustrating an example method of coordinating DRX configurations across user devices in a wireless communication system. The method may be performed, for example, by a small cell base station (e.g., the small cell base station 110C illustrated in FIG. 1).

As shown, the method 1500 includes the small cell base station assigning different DRX configurations for different communication channels (e.g., SCells) (block 1510). The small cell base station may then transmit (e.g., broadcast or multicast) a DRX configuration message to a plurality of user devices specifying one or more DRX parameters for each of the different DRX configurations (block 1520). Communication then proceeds via the communication channels, where for each of the communication channels, the communication uses a corresponding one of the DRX configurations (block 1530).

As discussed in more detail above, the DRX configuration message may be broadcasted on a licensed frequency band PCell for different unlicensed frequency band SCells providing the different communication channels. As an example, the DRX configuration message may be broadcasted in a SIB. The specified DRX parameters may include, for example, a DRX gap, a duty cycle, cycle timing, or a combination thereof.

As further discussed in more detail above, the DRX configuration message may be used to coordinate DRX with different CSAT cycling parameters (optional block 1540). As an example, one or more cycling parameters may be set for a first TDM communication pattern defining CSAT ON (activated) and CSAT OFF (deactivated) periods of transmission on a first one of the communication channels such that the first TDM communication pattern is aligned with the corresponding DRX configuration of the first one of the communication channels. Similarly, one or more cycling parameters may be set for a second TDM communication pattern (different from the first TDM communication pattern) defining CSAT ON (activated) and CSAT OFF (deactivated) periods of transmission on a second one of the communication channels such that the second TDM communication pattern is aligned with the corresponding DRX configuration of the second one of the communication channels. Operation may then be cycled between CSAT ON (activated) and CSAT OFF (deactivated) periods of transmission on the first one and second one of the communication channels in accordance with the first and second TDM communication patterns.

To maintain the DRX and CSAT coordination, the small cell base station may monitor (e.g., continuously, periodically, or on an event-driven basis) for changes in the CSAT communication scheme and dynamically adjust the DRX configurations, as needed, based on (directly or indirectly) the same underlying inter-RAT utilization of the shared resource invoking CSAT (optional block 1550). For example, the small cell base station may receive signals via the resource using a first (e.g., Wi-Fi) RAT, whereas the first one and second one of the communication channels share the resource but are associated with a second (e.g., LTE) RAT. The resource may include or otherwise correspond to, for example, an unlicensed radio frequency band shared by Wi-Fi and LTE devices, as discussed above. The small cell base station may then identify a utilization of the resource that is associated with the first RAT based on the received signals (block 1520). Utilization of the resource may give an indication of an amount of interference (e.g., co-channel interference) that is associated with first RAT signaling.

Based on the identified utilization of the resource, the small cell base station may adjust the first and second TDM communication patterns and adjust the corresponding DRX configurations to align with the adjusted first and second TDM communication patterns. The adjusted DRX configurations may then be transmitted to the plurality of user devices, using the DRX configuration message provided herein.

Returning again to FIG. 7 and the discussion above, other advantages that may be provided by applying different TDM communication patterns to different frequencies include improved management of higher QoS traffic. For example, relatively long CSAT OFF (deactivated) periods (e.g., on the order of hundreds of msec) on any given frequency (e.g., SCell) may introduce latencies that are detrimental to some applications, including high QoS real-time or near real-time communications such as Voice-Over-IP (VOIP). One approach to combating this is to specially adapt the TDM communication patterns to protect latency sensitive applications, such as by using a tighter CSAT cycle (i.e., shorter CSAT ON (activated)/CSAT OFF (deactivated) period durations), as discussed above. Alternatively or in addition, however, the TDM communication patterns may also be staggered in time across the different frequencies with respect to an overlap in their CSAT ON (activated)/CSAT OFF (deactivated) periods, such that user traffic on a particular frequency that is deactivated for a given period may be switched over to another, activated frequency for service during that time period. The staggering of TDM communication patterns may be employed across different frequencies for downlink CSAT communication (e.g., transmission by the small cell base station) as well as for uplink CSAT communication (e.g., transmission by a user device).

Figure 16:
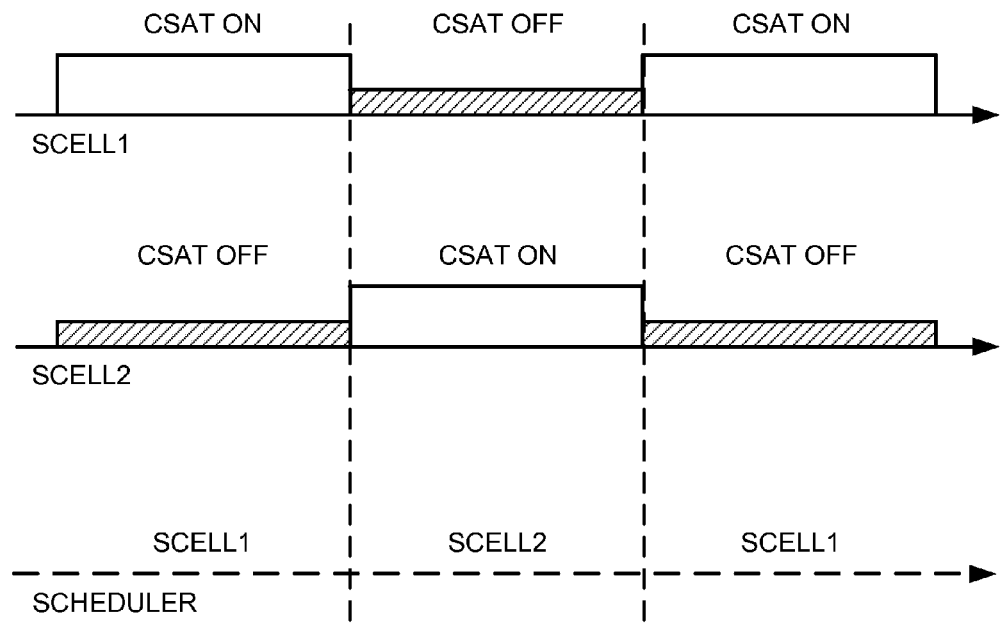
FIG. 16 illustrates an example CSAT communication scheme utilizing staggered TDM communication patterns across different frequencies.

FIG. 16 illustrates an example CSAT communication scheme utilizing staggered TDM communication patterns across different frequencies. In this example, two frequencies (provided as SCell1 and SCell2) are shown for illustration purposes. Their respective TDM communication patterns are staggered in time with respect to an overlap in their CSAT ON (activated) and CSAT OFF (deactivated) periods, such that the small cell base station (e.g., via its scheduler) may use at least one frequency for communication over a shared resource at any given time.

Figure 17:
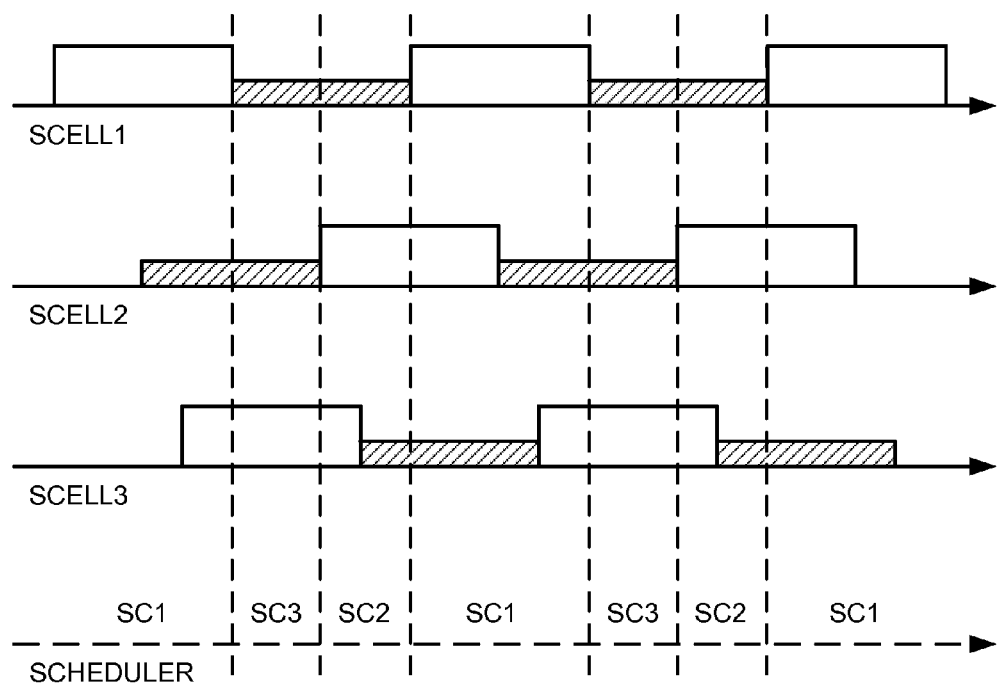
FIG. 17 illustrates another example CSAT communication scheme utilizing staggered TDM communication patterns across different frequencies.

FIG. 17 illustrates another example CSAT communication scheme utilizing staggered TDM communication patterns across different frequencies. In this example, three frequencies (provided as SCell1, SCell2, and SCell3) are shown for illustration purposes. Their respective TDM communication patterns are again staggered in time with respect to an overlap in their CSAT ON (activated) and CSAT OFF (deactivated) periods, such that the small cell base station (e.g., via its scheduler) may use at least one frequency for communication over a shared resource at any given time.

Figure 18:
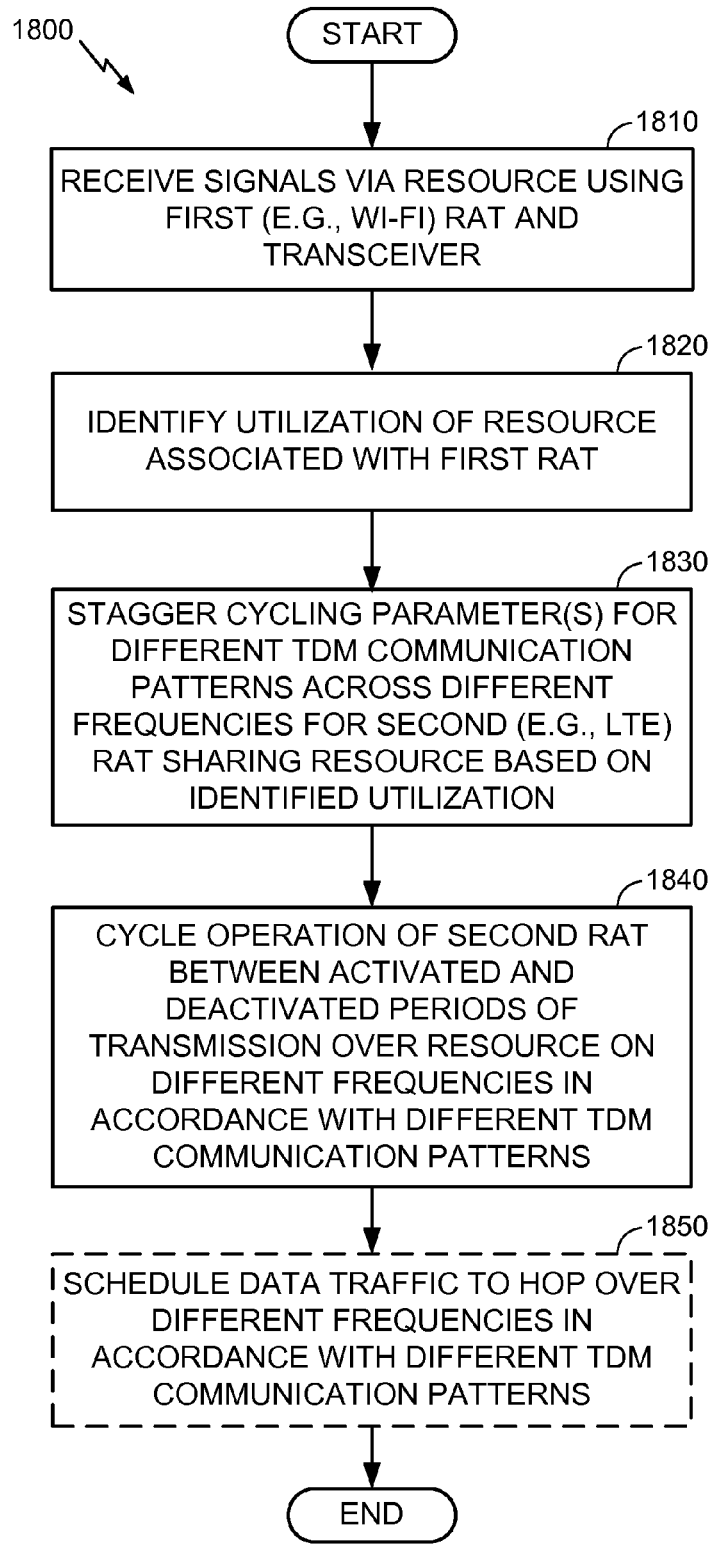
FIG. 18 is a flow diagram illustrating an example method of CSAT communication employing staggered TDM communication patterns.

FIG. 18 is a flow diagram illustrating an example method of CSAT communication employing staggered TDM communication patterns. The method may be performed, for example, in whole or in part, by a small cell base station (e.g., the small cell base station 110C illustrated in FIG. 1) and/or by a user device (e.g., the user device 120C illustrated in FIG. 1).

As shown, the method 1800 includes receiving signals via a resource using a first (e.g., Wi-Fi) RAT (block 1810). The resource may include or otherwise correspond to, for example, an unlicensed radio frequency band shared by Wi-Fi and LTE devices. The small cell base station and/or user device may then identify a utilization of the resource that is associated with the first RAT based on the received signals (block 1820). Utilization of the resource may give an indication of an amount of interference (e.g., co-channel interference) that is associated with first RAT signaling.

Based on the identified utilization of the resource, cycling parameters may be set for different TDM communication patterns defining respective CSAT ON (activated) and CSAT OFF (deactivated) periods of transmission for different frequencies (SCells) of a second (e.g., LTE) RAT sharing the resource (block 1830). For example, one or more cycling parameters may be set for a first TDM communication pattern on a first frequency and one or more cycling parameters may be set for a second TDM communication pattern on a second frequency, with the first TDM communication pattern and the second TDM communication pattern being staggered in time with respect to an overlap in their CSAT ON (activated) and CSAT OFF (deactivated) periods. In particular, the first TDM communication pattern and the second TDM communication pattern may be staggered in time such that the CSAT ON (activated) periods of the first TDM communication pattern correspond to the CSAT OFF (deactivated) periods of the second TDM communication pattern, and the CSAT OFF (deactivated) periods of the first TDM communication pattern correspond to the CSAT ON (activated) periods of the second TDM communication pattern.

Operation of the second RAT may then be cycled between CSAT ON (activated) and CSAT OFF (deactivated) periods of transmission over the resource on the different frequencies in accordance with their respective TDM communication patterns (block 1840). When necessary or otherwise appropriate (e.g., for high-QoS applications), data traffic may be scheduled to hop over the different frequencies in accordance with the different TDM communication patterns in order to maintain a more constant and lower latency transmission stream (optional block 1850). In particular, returning to the example above, data traffic may be transmitted on the first frequency during a CSAT ON (activated) period of the first TDM communication pattern and transmitted on the second frequency during a CSAT OFF (deactivated) period of the first TDM communication pattern (i.e., corresponding to a CSAT ON (activated) period of the second TDM communication pattern). As discussed above, such a staggered arrangement among the TDM communication patterns corresponding to different frequencies allows data traffic to be steered towards and scheduled on an appropriate active connection at any given time.

Although CSAT communication may be used for co-existing with native RATs such as Wi-Fi (or other RATs or network operators) on different unlicensed frequencies and corresponding channels as discussed above, the interference impact to the native RAT may be different on those different channels. For example, the IEEE 802.11 protocol family of standards provides operation for a primary 20 MHz channel as well as optionally using secondary adjacent channels (e.g., extension channels) spaced ±20 MHz away for channel bonding and to increase Wi-Fi bandwidth to, for example, 40 MHz, 80 MHz, or 160 MHz. In the scenario where a Wi-Fi AP is using channel bonding of two 20 MHz channels to form a 40 MHz channel, or four 20 MHz channels to form an 80 MHz channel, and so on, one of the 20 MHz channels will be specified as a primary channel and the rest of the channels as secondary channels. Because primary channels are used by Wi-Fi APs to send beacons, high QoS traffic, and for connection setup exchanges (e.g., association and authentication), the impact of interference on a primary channel may be more substantial than on secondary channels.

Accordingly, channel selection (e.g., via the CHS algorithm 610) may be further configured to prefer operation on secondary channels as opposed to primary channels (if no clean channel is found). In either case, whether a primary or secondary channel is selected, a CSAT communication scheme may be implemented on the selected channel in accordance with the techniques provided herein to afford additional protection to the native RAT. If operation on a primary channel is necessary (e.g., if no clean or even secondary channels are found), the corresponding TDM communication pattern can be specially adapted to protect primary channel operation (e.g., using shorter CSAT ON (activation)/CSAT OFF (deactivation) period durations, using TDM communication patterns that minimize the overlap of LTE transmissions with Wi-Fi beacons, etc.). The small cell base station can classify which channels are primary or secondary through detecting a Wi-Fi beacon signal, for example, which may be sent on the primary channel, and also through reading the content of the Wi-Fi beacon signal, which may contain information identifying the primary channel and secondary channels used by the Wi-Fi AP. Similar techniques may be applied to other RATs as well when different channels provide different operations for the RAT.

Figure 19:
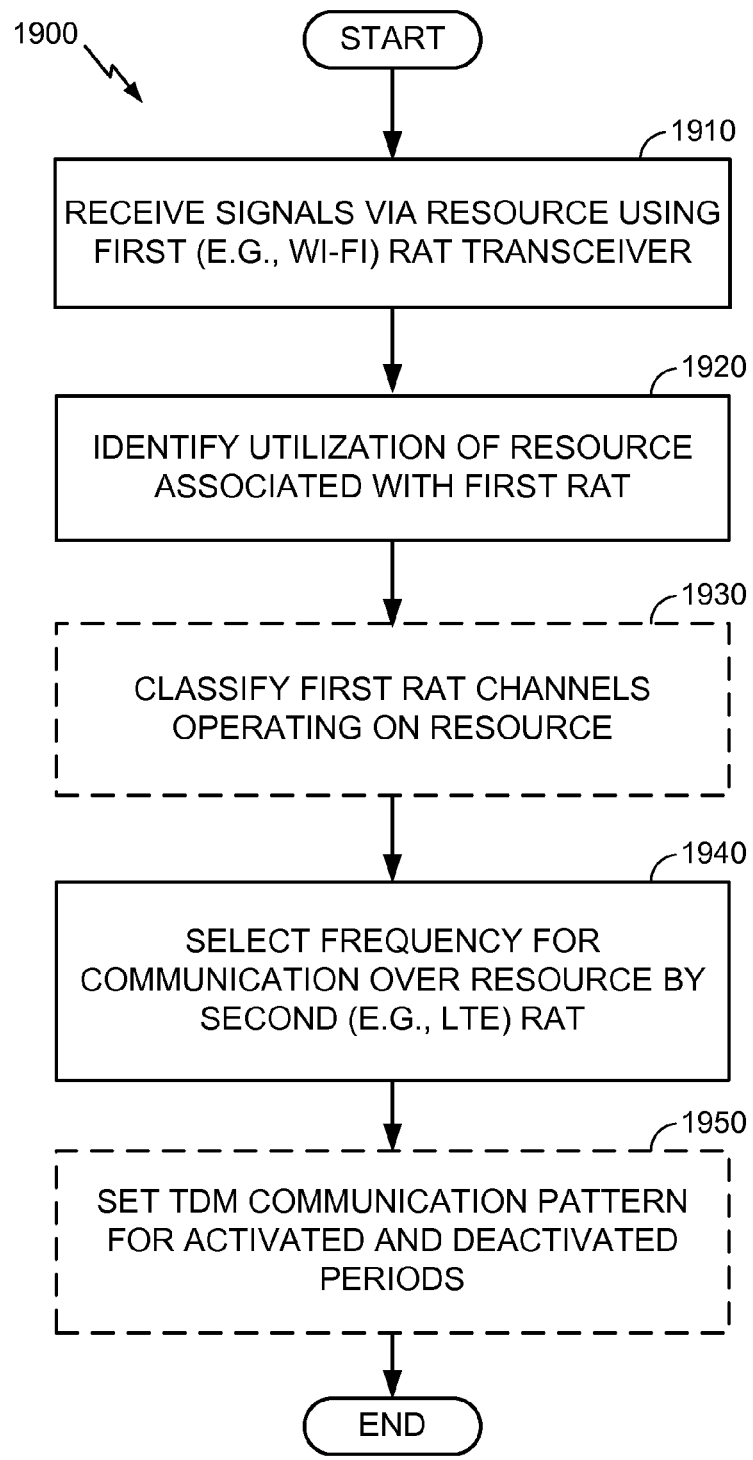
FIG. 19 is a flow diagram illustrating an example method of channel selection among a plurality of channels.

FIG. 19 is a flow diagram illustrating an example method of channel selection among a plurality of channels. The method may be performed, for example, by a small cell base station (e.g., the small cell base station 110C illustrated in FIG. 1).

As shown, the method 1900 may include receiving signals via a resource using a first (e.g., Wi-Fi) RAT (block 1910). The resource may include or otherwise correspond to, for example, an unlicensed radio frequency band shared by Wi-Fi and LTE devices. The small cell base station may then identify a utilization of the resource that is associated with the first RAT based on the received signals (block 1920). Utilization of the resource may give an indication of an amount of interference (e.g., co-channel interference) that is associated with first RAT signaling.

Based on the identified utilization of the resource, the small cell base station may select an unlicensed frequency for communication over the resource by a second (e.g. LTE) RAT (block 1940). For example, if the identified utilization of the resource is relatively clean (e.g., below a clean channel threshold) on a first frequency, the small cell base station may select that frequency for communication over the resource by the second RAT. However, if the identified utilization of the resource is not clean (e.g., above the clean channel threshold) on any of the plurality of frequencies available as a candidate, the small cell base station may select a second frequency for communication over the resource by the second RAT. In particular, a frequency associated with a secondary channel of the first RAT may be selected as the second frequency if one or more secondary channels are identified as operating on the resource, whereas a frequency associated with a primary channel of the first RAT may be selected as the second frequency if no secondary channels are identified as operating on the resource.

As discussed above, when necessary, the first RAT channels operating on the resource may be classified as primary or secondary in a variety of ways (optional block 1930). For example, the small cell base station may decode a beacon signal among the received signals and use the beacon signal (e.g., by mere header detection or by reading its contents) to identify if any secondary channels are operating on the resource. However, in other scenarios, the small cell base station may already have knowledge (e.g., via pre-provisioning or prior decoding operations) of which channel classes for the first RAT correspond to which frequencies in a shared frequency band.

In either case, when there is no clean channel available, the small cell base station may implement a CSAT communication scheme on the selected (second) frequency and set a TDM communication pattern defining CSAT ON (activated) and CSAT OFF (deactivated) periods of transmission on the second frequency over the resource by the second RAT (optional block 1950). While any of the TDM communication pattern adaptation techniques described above may be employed, when the frequency associated with the primary channel of the first RAT is selected as the (second) frequency, the TDM communication pattern may be further adapted to protect primary channel operation. For example, the TDM communication pattern may be set to use relatively short (e.g., below a threshold) CSAT ON (activated) and CSAT OFF (deactivated) period durations to reduce interference to connection setup signaling of the first RAT on the primary channel. As another example, the TDM communication pattern may be set to minimize overlap of the CSAT ON (activated) periods with beacon signaling of the first RAT on the primary channel.

Communications on the selected (second) frequency may also in some instances be sent at a lower power level in response to the frequency associated with the primary channel of the first RAT being selected as the second frequency, as compared to the frequency associated with the secondary channel of the first RAT being selected as the second frequency. This reduced transmission power may provide further protections for primary channel operation by the first RAT.

Figure 20:
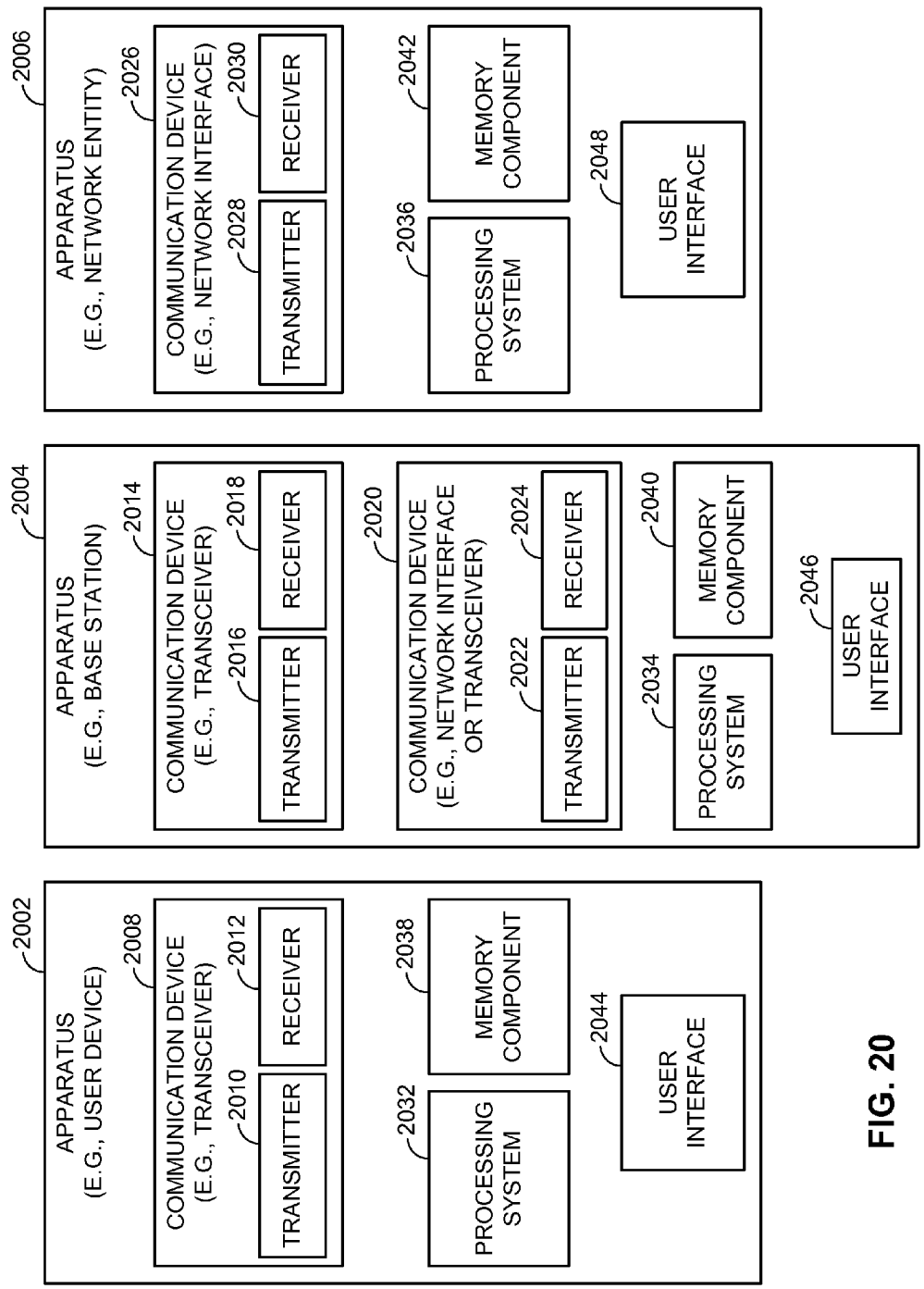
FIG. 20 is a simplified block diagram of several sample aspects of components that may be employed in communication nodes and configured to support communication as taught herein.

FIG. 20 illustrates several sample components (represented by corresponding blocks) that may be incorporated into an apparatus 2002, an apparatus 2004, and an apparatus 2006 (corresponding to, for example, a user device, a base station, and a network entity, respectively) to support the CSAT and related operations as taught herein. It will be appreciated that these components may be implemented in different types of apparatuses in different implementations (e.g., in an ASIC, in an SoC, etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 2002 and the apparatus 2004 each include at least one wireless communication device (represented by the communication devices 2008 and 2014 (and the communication device 2020 if the apparatus 2004 is a relay)) for communicating with other nodes via at least one designated RAT. Each communication device 2008 includes at least one transmitter (represented by the transmitter 2010) for transmitting and encoding signals (e.g., messages, indications, information, and so on) and at least one receiver (represented by the receiver 2012) for receiving and decoding signals (e.g., messages, indications, information, pilots, and so on). Similarly, each communication device 2014 includes at least one transmitter (represented by the transmitter 2016) for transmitting signals (e.g., messages, indications, information, pilots, and so on) and at least one receiver (represented by the receiver 2018) for receiving signals (e.g., messages, indications, information, and so on). If the apparatus 2004 is a relay station, each communication device 2020 may include at least one transmitter (represented by the transmitter 2022) for transmitting signals (e.g., messages, indications, information, pilots, and so on) and at least one receiver (represented by the receiver 2024) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. A wireless communication device (e.g., one of multiple wireless communication devices) of the apparatus 2004 may also comprise a Network Listen Module (NLM) or the like for performing various measurements.

The apparatus 2006 (and the apparatus 2004 if it is not a relay station) includes at least one communication device (represented by the communication device 2026 and, optionally, 2020) for communicating with other nodes. For example, the communication device 2026 may comprise a network interface that is configured to communicate with one or more network entities via a wire-based or wireless backhaul. In some aspects, the communication device 2026 may be implemented as a transceiver configured to support wire-based or wireless signal communication. This communication may involve, for example, sending and receiving: messages, parameters, or other types of information. Accordingly, in the example of FIG. 20, the communication device 2026 is shown as comprising a transmitter 2028 and a receiver 2030. Similarly, if the apparatus 2004 is not a relay station, the communication device 2020 may comprise a network interface that is configured to communicate with one or more network entities via a wire-based or wireless backhaul. As with the communication device 2026, the communication device 2020 is shown as comprising a transmitter 2022 and a receiver 2024.

The apparatuses 2002, 2004, and 2006 also include other components that may be used in conjunction with the CSAT and related operations as taught herein. The apparatus 2002 includes a processing system 2032 for providing functionality relating to, for example, user device operations to support CSAT and related aspects as taught herein and for providing other processing functionality. The apparatus 2004 includes a processing system 2034 for providing functionality relating to, for example, base station operations to support CSAT and related aspects as taught herein and for providing other processing functionality. The apparatus 2006 includes a processing system 2036 for providing functionality relating to, for example, network operations to support CSAT and related aspects as taught herein and for providing other processing functionality. The apparatuses 2002, 2004, and 2006 include memory components 2038, 2040, and 2042 (e.g., each including a memory device), respectively, for maintaining information (e.g., information indicative of reserved resources, thresholds, parameters, and so on). In addition, the apparatuses 2002, 2004, and 2006 include user interface devices 2044, 2046, and 2048, respectively, for providing indications (e.g., audible and/or visual indications) to a user and/or for receiving user input (e.g., upon user actuation of a sensing device such a keypad, a touch screen, a microphone, and so on).

For convenience, the apparatuses 2002, 2004, and/or 2006 are shown in FIG. 20 as including various components that may be configured according to the various examples described herein. It will be appreciated, however, that the illustrated blocks may have different functionality in different designs.

The components of FIG. 20 may be implemented in various ways. In some implementations, the components of FIG. 20 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 2008, 2032, 2038, and 2044 may be implemented by processor and memory component(s) of the apparatus 2002 (e.g., by execution of appropriate code and/or by appropriate configuration of processor components). Similarly, some or all of the functionality represented by blocks 2014, 2020, 2034, 2040, and 2046 may be implemented by processor and memory component(s) of the apparatus 2004 (e.g., by execution of appropriate code and/or by appropriate configuration of processor components). Also, some or all of the functionality represented by blocks 2026, 2036, 2042, and 2048 may be implemented by processor and memory component(s) of the apparatus 2006 (e.g., by execution of appropriate code and/or by appropriate configuration of processor components).

Figure 21:
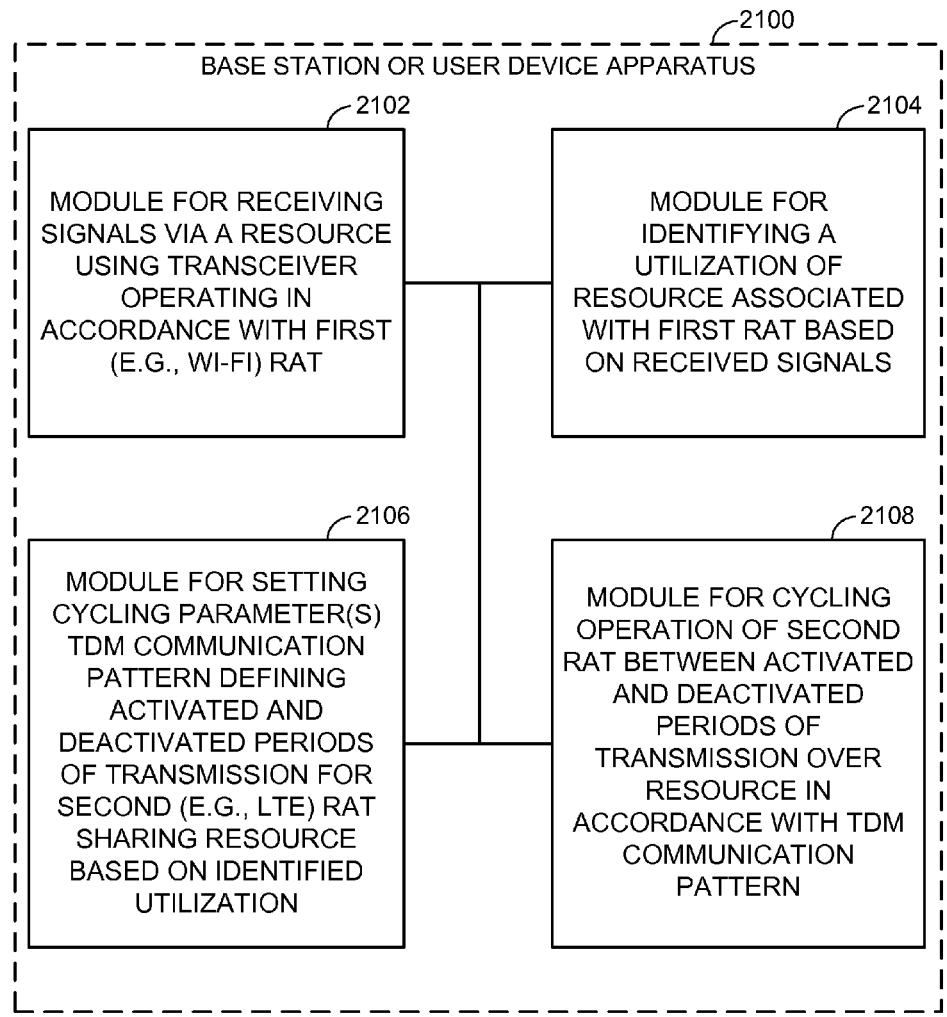
FIGS. 21-24 are other simplified block diagrams of several sample aspects of apparatuses configured to support communication as taught herein.

FIG. 21 illustrates an example base station or user device apparatus 2100 represented as a series of interrelated functional modules. A module for receiving 2102 may correspond at least in some aspects to, for example, a communication device as discussed herein. A module for identifying 2104 may correspond at least in some aspects to, for example, a processing system as discussed herein. A module for setting 2106 may correspond at least in some aspects to, for example, a processing system as discussed herein. A module for cycling 2108 may correspond at least in some aspects to, for example, a processing system in conjunction with a communication device as discussed herein.

Figure 22:
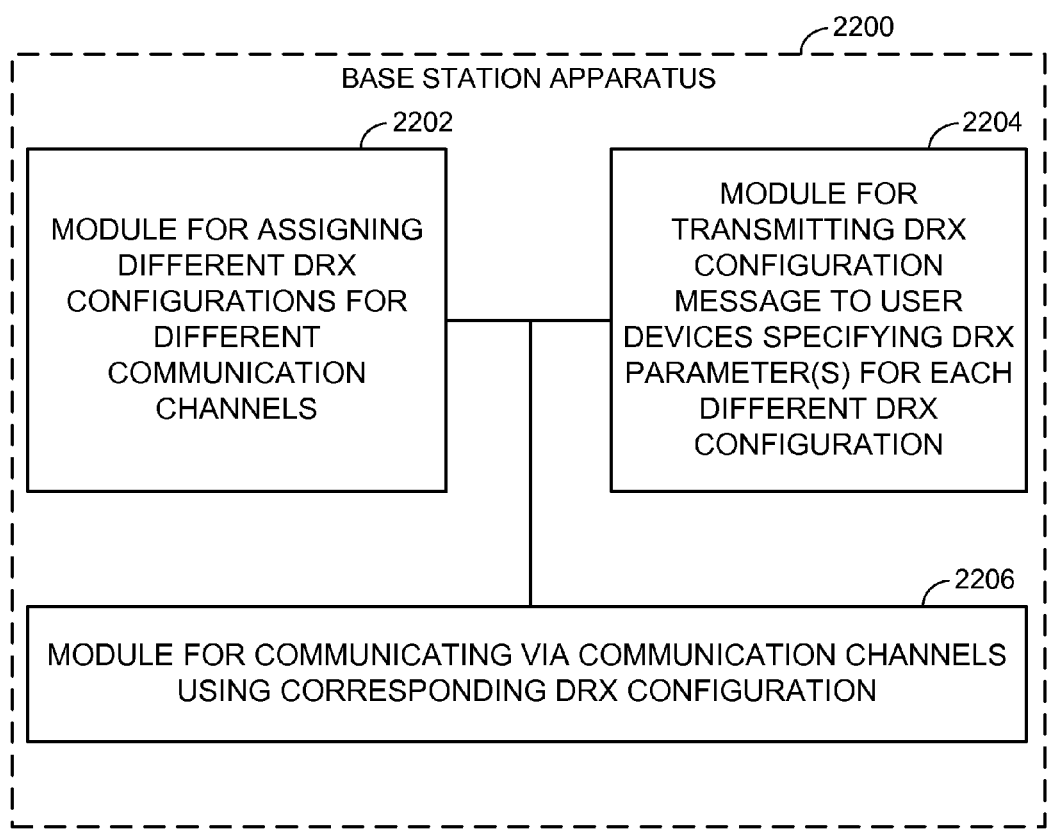

FIG. 22 illustrates an example base station apparatus 2200 represented as a series of interrelated functional modules. A module for assigning 2202 may correspond at least in some aspects to, for example, a processing system as discussed herein. A module for transmitting 2204 may correspond at least in some aspects to, for example, a communication device as discussed herein. A module for communicating 2206 may correspond at least in some aspects to, for example, a communication device as discussed herein.

Figure 23:
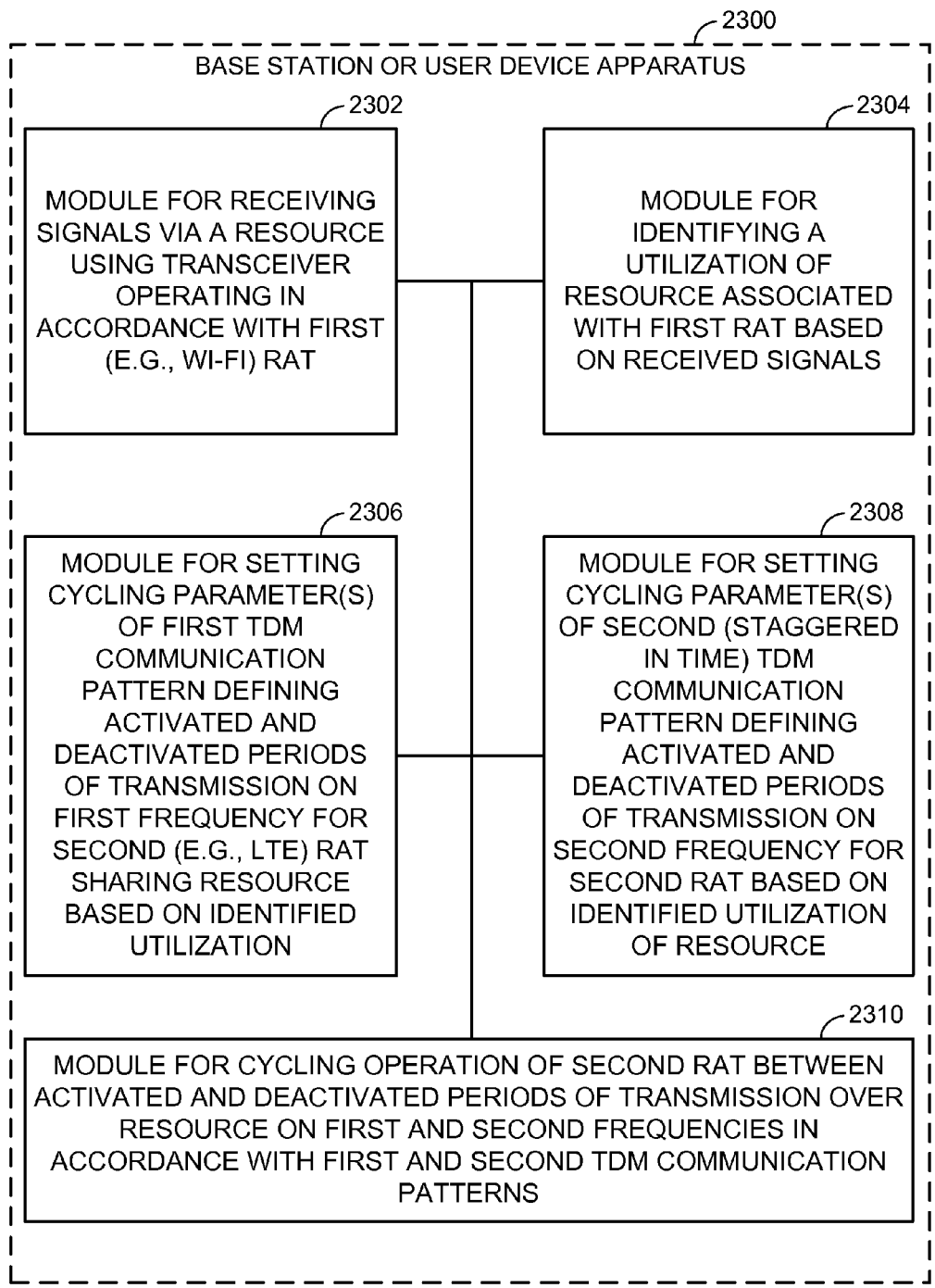

FIG. 23 illustrates an example base station or user device apparatus 2300 represented as a series of interrelated functional modules. A module for receiving 2302 may correspond at least in some aspects to, for example, a communication device as discussed herein. A module for identifying 2304 may correspond at least in some aspects to, for example, a processing system as discussed herein. A module for setting 2306 may correspond at least in some aspects to, for example, a processing system as discussed herein. A module for setting 2308 may correspond at least in some aspects to, for example, a processing system as discussed herein. A module for cycling 2310 may correspond at least in some aspects to, for example, a processing system in conjunction with a communication device as discussed herein.

Figure 24:
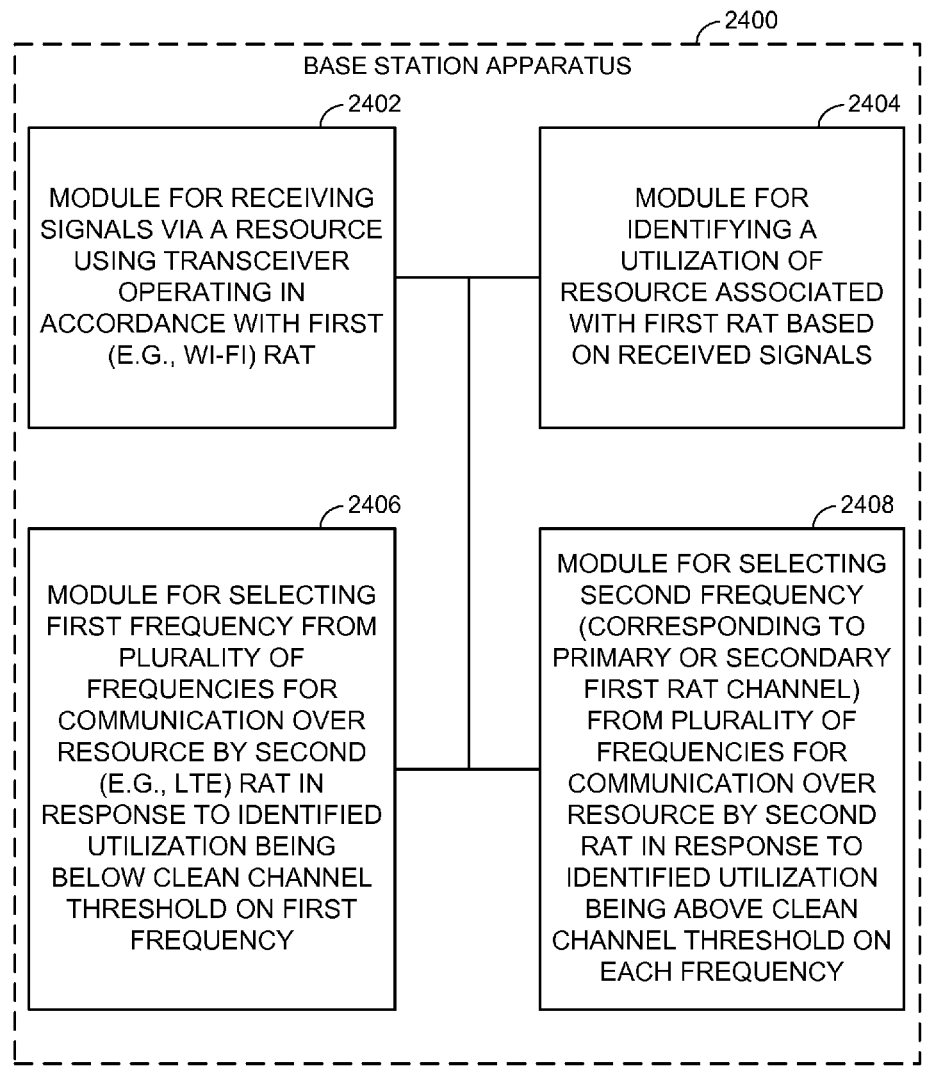

FIG. 24 illustrates an example base station apparatus 2400 represented as a series of interrelated functional modules. A module for receiving 2402 may correspond at least in some aspects to, for example, a communication device as discussed herein. A module for identifying 2404 may correspond at least in some aspects to, for example, a processing system as discussed herein. A module for selecting 2406 may correspond at least in some aspects to, for example, a processing system as discussed herein. A module for selecting 2408 may correspond at least in some aspects to, for example, a processing system as discussed herein.

The functionality of the modules of FIGS. 21-24 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 21-24, as well as other components and functions described herein, may be implemented using any suitable means. Such means also may be implemented, at least in part, using corresponding structure as taught herein. For example, the components described above in conjunction with the "module for" components of FIGS. 21-24 also may correspond to similarly designated "means for" functionality. Thus, in some aspects one or more of such means may be implemented using one or more of processor components, integrated circuits, or other suitable structure as taught herein.

Figure 25:
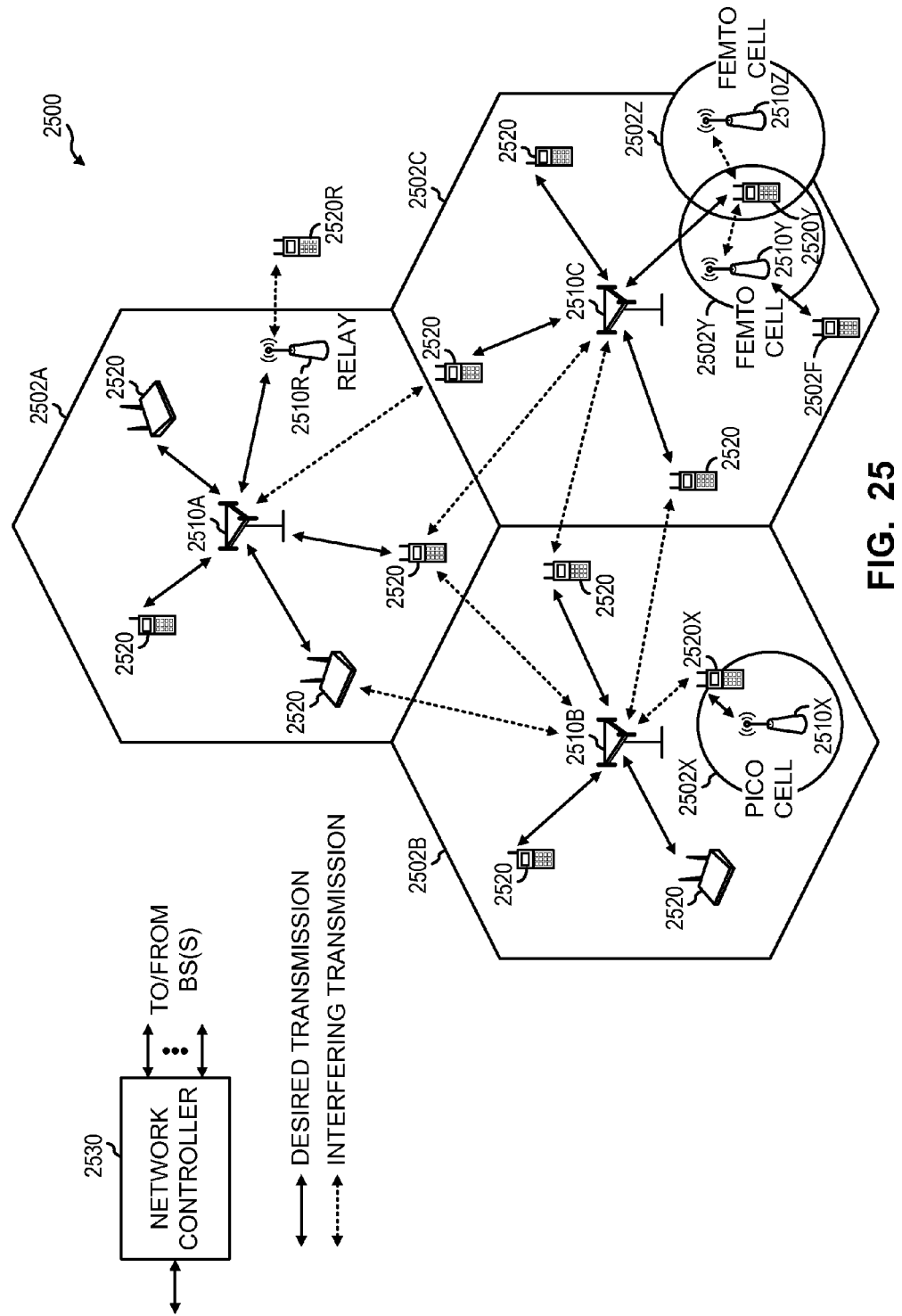
FIG. 25 illustrates an example communication system environment in which the teachings and structures herein may be may be incorporated.

FIG. 25 illustrates an example communication system environment in which the CSAT and related operation teachings and structures herein may be may be incorporated. The wireless communication system 2500, which will be described at least in part as an LTE network for illustration purposes, includes a number of eNBs 2510 and other network entities. Each of the eNBs 2510 provides communication coverage for a particular geographic area, such as macro cell or small cell coverage areas.

In the illustrated example, the eNBs 2510A, 2510B, and 2510C are macro cell eNBs for the macro cells 2502A, 2502B, and 2502C, respectively. The macro cells 2502A, 2502B, and 2502C may cover a relatively large geographic area (e.g., several kilometers in radius) and may allow unrestricted access by UEs with service subscription. The eNB 2510X is a particular small cell eNB referred to as a pico cell eNB for the pico cell 2502X. The pico cell 2502X may cover a relatively small geographic area and may allow unrestricted access by UEs with service subscription. The eNBs 2510Y and 2510Z are particular small cells referred to as femto cell eNBs for the femto cells 2502Y and 2502Z, respectively. The femto cells 2502Y and 2502Z may cover a relatively small geographic area (e.g., a home) and may allow unrestricted access by UEs (e.g., when operated in an open access mode) or restricted access by UEs having association with the femto cell (e.g., UEs in a Closed Subscriber Group (CSG), UEs for users in the home, etc.), as discussed in more detail below.

The wireless network 2500 also includes a relay station 2510R. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs (e.g., a mobile hotspot). In the example shown in FIG. 25, the relay station 2510R communicates with the eNB 2510A and a UE 2520R in order to facilitate communication between the eNB 2510A and the UE 2520R. A relay station may also be referred to as a relay eNB, a relay, etc.

The wireless network 2500 is a heterogeneous network in that it includes eNBs of different types, including macro eNBs, pico eNBs, femto eNBs, relays, etc. As discussed in more detail above, these different types of eNBs may have different transmit power levels, different coverage areas, and different impacts on interference in the wireless network 2500. For example, macro eNBs may have a relatively high transmit power level whereas pico eNBs, femto eNBs, and relays may have a lower transmit power level (e.g., by a relative margin, such as a 10 dBm difference or more).

Returning to FIG. 25, the wireless network 2500 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. Unless otherwise noted, the techniques described herein may be used for both synchronous and asynchronous operation.

A network controller 2530 may couple to a set of eNBs and provide coordination and control for these eNBs. The network controller 2530 may communicate with the eNBs 2510 via a backhaul. The eNBs 2510 may also communicate with one another, e.g., directly or indirectly via a wireless or wireline backhaul.

As shown, the UEs 2520 may be dispersed throughout the wireless network 2500, and each UE may be stationary or mobile, corresponding to, for example, a cellular phone, a personal digital assistant (PDA), a wireless modem, a wireless communication device, a handheld device, a laptop computer, a cordless phone, a wireless local loop (WLL) station, or other mobile entities. In FIG. 25, a solid line with double arrows indicates desired transmissions between a UE and a serving eNB, which is an eNB designated to serve the UE on the downlink and/or uplink. A dashed line with double arrows indicates potentially interfering transmissions between a UE and an eNB. For example, UE 2520Y may be in proximity to femto eNBs 2510Y, 2510Z. Uplink transmissions from UE 2520Y may interfere with femto eNBs 2510Y, 2510Z. Uplink transmissions from UE 2520Y may jam femto eNBs 2510Y, 2510Z and degrade the quality of reception of other uplink signals to femto eNBs 2510Y, 2510Z.

Small cell eNBs such as the pico cell eNB 2510X and femto eNBs 2510Y, 2510Z may be configured to support different types of access modes. For example, in an open access mode, a small cell eNB may allow any UE to obtain any type of service via the small cell. In a restricted (or closed) access mode, a small cell may only allow authorized UEs to obtain service via the small cell. For example, a small cell eNB may only allow UEs (e.g., so called home UEs) belonging to a certain subscriber group (e.g., a CSG) to obtain service via the small cell. In a hybrid access mode, alien UEs (e.g., non-home UEs, non-CSG UEs) may be given limited access to the small cell. For example, a macro UE that does not belong to a small cell's CSG may be allowed to access the small cell only if sufficient resources are available for all home UEs currently being served by the small cell.

By way of example, femto eNB 2510Y may be an open-access femto eNB with no restricted associations to UEs. The femto eNB 2510Z may be a higher transmission power eNB initially deployed to provide coverage to an area. Femto eNB 2510Z may be deployed to cover a large service area. Meanwhile, femto eNB 2510Y may be a lower transmission power eNB deployed later than femto eNB 2510Z to provide coverage for a hotspot area (e.g., a sports arena or stadium) for loading traffic from either or both eNB 2510C, eNB 2510Z.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method for CSAT and related operations.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of Carrier Sense Adaptive Transmission (CSAT) for reducing interference between Radio Access Technologies (RATs), comprising:
   receiving, at a device, signals associated with a first RAT via a resource, wherein a first transceiver operating in accordance with the first RAT receives the signals;
   identifying, by the device, a utilization of the resource that is associated with the first RAT, wherein the identifying is based on extracted characteristics of packets of the first RAT detected in the received signals;
   determining a Quality of Service (QoS) requirement associated with the first RAT or a second RAT sharing the resource;
   setting, by the device, one or more cycling parameters of a Time Division Multiplexing (TDM) communication pattern defining activated and deactivated periods of transmission for the second RAT, wherein the setting is based on the identified utilization of the resource and the determined QoS requirement;
   cycling, by the device, operation of the second RAT between activated and deactivated periods of transmission over the resource in accordance with the TDM communication pattern; and
   requesting, by the device, that a measurement be conducted on the resource during a deactivated period of the TDM communication pattern, wherein the measurement is for the signals received using the first transceiver operating in accordance with the first RAT.

2. The method of claim 1, wherein the resource is an unlicensed radio frequency band.

3. The method of claim 1, wherein:
   the first RAT comprises Wi-Fi technology; and
   the second RAT comprises Long Term Evolution (LTE) technology.

4. The method of claim 1, wherein:
   a second transceiver operating in accordance with the second RAT performs transmission over the resource during the activated periods of the TDM communication pattern; and
   the first transceiver and the second transceiver are co-located.

5. The method of claim 1, wherein identifying the utilization of the resource comprises determining at least one of: a transmission duration associated with a packet of the first RAT, a received signal strength associated with a packet of the first RAT, or a combination thereof.

6. The method of claim 5, wherein the determining comprises decoding at least one of: a preamble, a Physical (PHY) header, a Medium Access Control (MAC) header, a beacon, a probe request, a probe response, or a combination thereof.

7. The method of claim 1, wherein the setting comprises changing at least one of the one or more cycling parameters based on a comparison of the identified utilization of the resource with a threshold associated with a level of protection afforded to the first RAT.

8. The method of claim 7, wherein the determining the QoS requirement comprises:
   determining the QoS requirement associated with the first RAT based on the received signals; and
   adjusting the threshold based on the determined QoS requirement associated with the first RAT.

9. The method of claim 1, wherein the one or more cycling parameters comprise at least one of: a duty cycle, a transmit power, cycle timing, or a combination thereof.

10. The method of claim 1, further comprising:
    determining a traffic or backhaul limitation associated with the second RAT, wherein the setting is further based on the determined limitation.

11. The method of claim 1, wherein the determining the QoS requirement comprises:
    determining the (QoS) requirement associated with the second RAT, wherein the setting is further based on the determined QoS requirement associated with the second RAT.

12. The method of claim 1, further comprising:
    determining that a retransmission procedure is pending, wherein the retransmission procedure is associated with communication on the resource by the second RAT; and
    extending an activated period of the TDM communication pattern for the second RAT on the resource in response to the determination.

13. The method of claim 1, further comprising transmitting a Clear-to-Send-to-Self (CTS2S) message on the resource via the first RAT to reserve the resource for a transmission by the second RAT.

14. The method of claim 1, wherein the device comprises a small cell base station.

15. The method of claim 1, wherein the device comprises a user device.

16. The method of claim 15, further comprising:
transmitting a message from the user device to a small cell base station, wherein the message is based on the utilization of the resource; and
receiving a response message at the user device from the small cell base station, wherein the response message is received in response to the transmitted message and comprises at least one of the one or more cycling parameters.

17. The method of claim 16, wherein:
the message transmitted to the small cell base station comprises measurement information indicative of the utilization of the resource; and
the response message received from the small cell base station comprises a cycling parameter determined by the small cell base station based on the measurement information.

18. The method of claim 16, wherein:
the message transmitted to the small cell base station comprises a recommended cycling parameter determined by the user device based on the identified utilization of the resource; and
the response message received from the small cell base station comprises a confirmation of the recommended cycling parameter.

19. The method of claim 16, wherein the at least one of the one or more cycling parameters received in the response message from the small cell base station synchronizes (i) cycling of uplink operation of the second RAT by the user device and (ii) cycling of downlink operation of the second RAT by the small cell base station.

20. An apparatus for Carrier Sense Adaptive Transmission (CSAT) for reducing interference between Radio Access Technologies (RATs), comprising:
a first transceiver of a device configured to receive signals associated with a first RAT via a resource, wherein the first transceiver operates in accordance with the first RAT to receive the signals;
at least one processor of the device; and
at least one memory of the device coupled to the at least one processor, the at least one processor and the at least one memory being configured to:
identify a utilization of the resource that is associated with the first RAT, wherein the identifying identification is based on extracted characteristics of packets of the first RAT detected in the received signals,
determine a Quality of Service (QoS) requirement associated with the first RAT or a second RAT sharing the resource,
set one or more cycling parameters of a Time Division Multiplexing (TDM) communication pattern defining activated and deactivated periods of transmission for the second RAT, wherein the setting is based on the identified utilization of the resource and the determined QoS requirement,
control cycling of operation of the second RAT between activated and deactivated periods of transmission over the resource in accordance with the TDM communication pattern, and
request that a measurement be conducted on the resource during a deactivated period of the TDM communication pattern, wherein the measurement is for the signals received using the first transceiver operating in accordance with the first RAT.

\* \* \* \* \*